US012731971B2

(12) United States Patent
Ciesielczyk et al.

(10) Patent No.: US 12,731,971 B2
(45) Date of Patent: Sep. 8, 2026

(54) SEGMENTED CABLE TANGENT CLAMP

(71) Applicant: Preformed Line Products Co., Mayfield Village, OH (US)

(72) Inventors: Benjamin Franklin Ciesielczyk, Madison, OH (US); Douglas Bell, Mayfield Heights, OH (US); Jacob Jeffrey Palmer, Chesterland, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 18 days.

(21) Appl. No.: 18/220,947

(22) Filed: Jul. 12, 2023

(65) Prior Publication Data

US 2024/0022057 A1 Jan. 18, 2024

Related U.S. Application Data

(60) Provisional application No. 63/388,443, filed on Jul. 12, 2022.

(51) Int. Cl.
*H02G 3/32* (2006.01)

(52) U.S. Cl.
CPC .................................... *H02G 3/32* (2013.01)

(58) Field of Classification Search
CPC ........................................................ H02G 3/32
See application file for complete search history.

(56) References Cited

U.S. PATENT DOCUMENTS

| | | | | | |
|---|---|---|---|---|---|
| 3,752,902 | A * | 8/1973 | Wilson | H01B 17/145 | 174/163 F |
| 3,819,287 | A * | 6/1974 | Axelsson | F16L 3/1091 | 24/136 R |
| 4,709,888 | A * | 12/1987 | Cubit | F16L 3/221 | 52/39 |
| 4,771,137 | A * | 9/1988 | Thompson | H01B 17/145 | 174/172 |
| 5,063,274 | A * | 11/1991 | Johnson | H01B 17/145 | 174/175 |
| 5,067,677 | A * | 11/1991 | Miceli | H02G 3/26 | D8/356 |
| 5,149,026 | A * | 9/1992 | Allen | F16L 5/10 | 248/74.1 |
| 5,188,318 | A * | 2/1993 | Newcomer | H02G 3/24 | 248/68.1 |
| 5,564,658 | A * | 10/1996 | Rinderer | H02G 3/263 | 248/68.1 |
| 5,587,555 | A * | 12/1996 | Rinderer | F16L 3/22 | 411/502 |
| 5,876,000 | A * | 3/1999 | Ismert | F16L 3/221 | 248/65 |

(Continued)

*Primary Examiner* — Monica E Millner
(74) *Attorney, Agent, or Firm* — Cooper Legal Group, LLC

(57) ABSTRACT

A tangent clamp includes a body to be supported by a structure and to permit cables to proceed along a tangential direction relative to the structure. The tangent clamp may include at least one actuatable clamping portion associated with the body to support a respective one of the cables. The body is configured to permit at least one additional actuatable clamping portion to be provided upon the body. The tangent clamp may include a plurality of separately actuatable clamping portions associated with the body. The body may be provided as multiple portions. The multiple portions are relatively movable to permit the body to be mounted upon the structure.

20 Claims, 12 Drawing Sheets

(56) References Cited

U.S. PATENT DOCUMENTS

| | | | | | |
|---|---|---|---|---|---|
| 5,931,423 | A * | 8/1999 | Heideloff | F16L 3/2235 | 248/219.3 |
| 6,623,303 | B2 * | 9/2003 | Syed | H01R 13/6485 | 439/470 |
| 6,676,091 | B2 * | 1/2004 | Hauer | F16L 3/1075 | 248/74.3 |
| 6,892,990 | B2 * | 5/2005 | Pisczak | H02G 7/053 | 248/62 |
| 6,939,165 | B1 * | 9/2005 | Wu | F16L 3/2235 | 439/492 |
| 7,223,918 | B2 * | 5/2007 | Gelibert | H01R 4/5066 | 174/95 |
| 7,345,241 | B2 * | 3/2008 | Caveney | H04Q 1/142 | 174/99 R |
| 8,882,053 | B2 * | 11/2014 | Chirpich | F16L 3/08 | 248/68.1 |
| 8,985,531 | B2 * | 3/2015 | Wood | B22F 10/28 | 248/68.1 |
| 9,780,548 | B1 * | 10/2017 | Kranz | G02B 6/44785 | |
| 10,439,381 | B1 * | 10/2019 | Mohlman | H02G 3/0406 | |
| 10,632,594 | B2 * | 4/2020 | Short | F16L 3/18 | |
| 10,975,988 | B2 * | 4/2021 | Pieske | F16L 3/1091 | |
| 11,569,648 | B2 * | 1/2023 | Sailer | H02G 7/053 | |
| 11,639,759 | B2 * | 5/2023 | Itokazu | H02G 3/32 | 248/68.1 |
| 11,662,041 | B2 * | 5/2023 | Laughlin | F16L 3/237 | 248/68.1 |
| 12,149,056 | B2 * | 11/2024 | Sailer | H02G 7/205 | |
| 2018/0080579 | A1 * | 3/2018 | Costigan | H04Q 1/06 | |
| 2019/0204522 | A1 * | 7/2019 | Courchaine | H02G 3/32 | |
| 2021/0149139 | A1 * | 5/2021 | Berry | G02B 6/4439 | |

* cited by examiner

SEGMENTED CABLE TANGENT CLAMP

RELATED APPLICATION

Priority is claimed from U.S. Patent Application No. 63/388,443, the entirety of which is hereby incorporated by reference herein.

TECHNICAL FIELD

The present disclosure is directed towards supporting multiple suspended cables (e.g., lines).

BACKGROUND

Clamps are utilized to hold suspended cables (e.g., lines). Within some examples, such held, suspended cables are fiber optic cables.

Some of the holding clamps are tangent clamps. If the held cables are fiber optic cables, the tangent clamps may be referred to as fiber tangent clamps.

Some tangent clamps (e.g., fiber tangent clamps) currently on the market are designed to hold a single cable. Some tangent clamps (e.g., fiber tangent clamps) on the market may hold multiple cables.

Tangent clamps that can hold multiple cables (e.g., fiber optic cables) are becoming more popular in areas where utilities are stringing small drop cables down several spans to reduce the number of closures and splices in the system. Such a multi-cable clamp uses a cushion with multiple slots in the cushion in order to accept and hold the multiple cables. While this may work well initially, if a cable needs to added or removed at a later date, all of the cables contained within that cushion must be disturbed during the addition/removal process. The cables have their holding force released (e.g., the cushion is relaxed and thus the holding force is lost) for a period of time while work is being done, and then the holding force is reapplied once the work is completed. This disturbance of the holding force has the potential to cause damage to the existing cables.

Also, it is possible that the structures (e.g., utility poles) to which the clamps (e.g., tangent clamps, including fiber tangent clamps) are attached for cable (e.g., line) suspension may not be owned by the owner of the cables being attached to such structures. It is possible that leasing, rental or the like (e.g., cost) for the right to attach clamps for cable suspension is needed. Costs may vary for several reasons, possibly including number of supported clamps that are attached, the number of attachment devices (e.g., fasteners) extending to/into such structures, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a tangent clamp. The tangent clamp includes a body to be supported by a structure and to permit cables to proceed along a tangential direction relative to the structure. The tangent clamp includes a plurality of separately actuatable clamping portions associated with the body. Each of the separately actuatable clamping portions supports a respective one of the cables.

In accordance with one or more aspects, the present disclosure provides a tangent clamp. The tangent clamp includes a body to be supported by a structure and to permit cables to proceed along a tangential direction relative to the structure. The tangent clamp includes at least one clamping portion associated with the body. Each of the at least one clamping portion supports a respective one of the cables. Each of the at least one clamping portion has a segment to grip and retain the respective one of the cables while the respective at least one clamping portion is in a respective actuated condition. The body being provided as multiple portions. The multiple portions are relatively movable to permit the body to be mounted upon the structure.

In accordance with one or more aspects, the present disclosure provides a tangent clamp. The tangent clamp includes a body to be supported by a structure and to permit cables to proceed along a tangential direction relative to the structure. The tangent clamp includes at least one actuatable clamping portion associated with the body to support a respective one of the cables. The body is configured to permit at least one additional actuatable clamping portion to be provided upon the body.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DESCRIPTION OF THE DRAWINGS

FIG. 8 is a perspective illustration of another example cable tangent clamp, in accordance with some aspects of the present disclosure, which may hold plural cables and with a body having an aperture to receive a single fastener to attach the clamp to a pole or similar.

FIG. 15 is a perspective illustration of another example cable tangent clamp, in accordance with some aspects of the present disclosure, which may hold plural cables, and in which pairs of clamping portions are modular and may be added or subtracted from the overall clamp, and showing a schematic fastener that attaches the clamp to a utility pole or the like.

FIG. 17 is a perspective illustration of another example cable tangent clamp, in accordance with some aspects of the present disclosure, which may hold plural cables and which has a body having an aperture to receive a single fastener or bracket portion to attach the clamp to a utility pole or similar.

FIG. 20 is an illustration of an example similar to FIG. 18, in accordance with some aspects of the present disclosure, and shows the portion located upon a bracket to permit attachment to a utility pole or similar.

DETAILED DESCRIPTION

Figure 1:
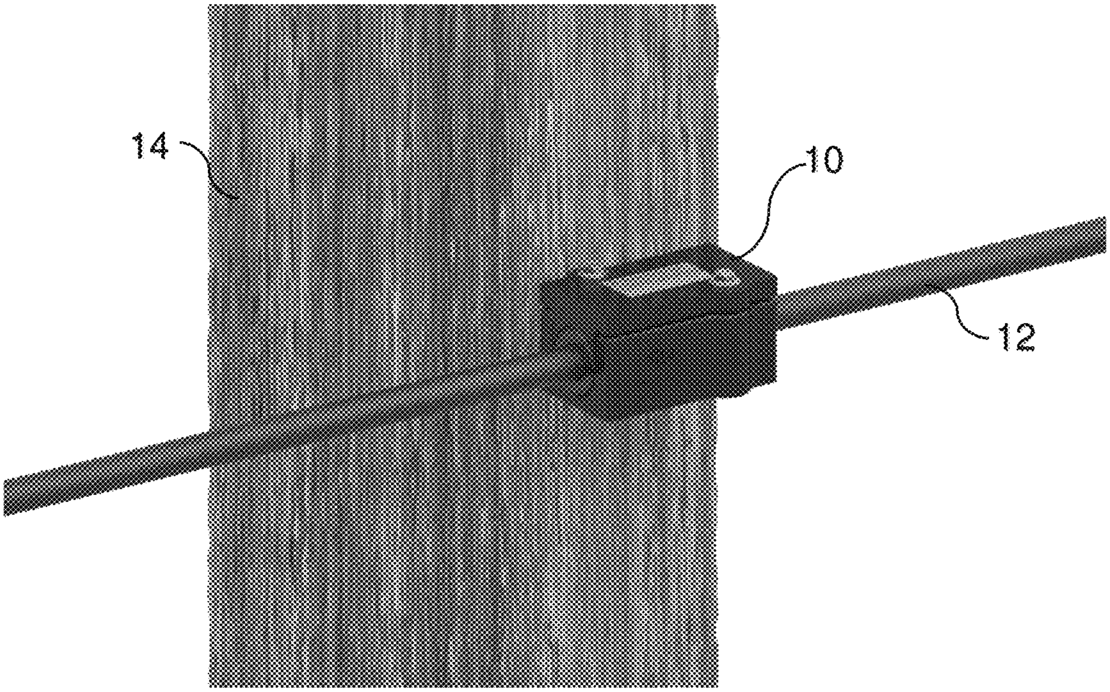
FIG. 1 is perspective picture of a cable tangent clamp that may hold a single cable, with the clamp attached to a utility pole.
Figure 2:
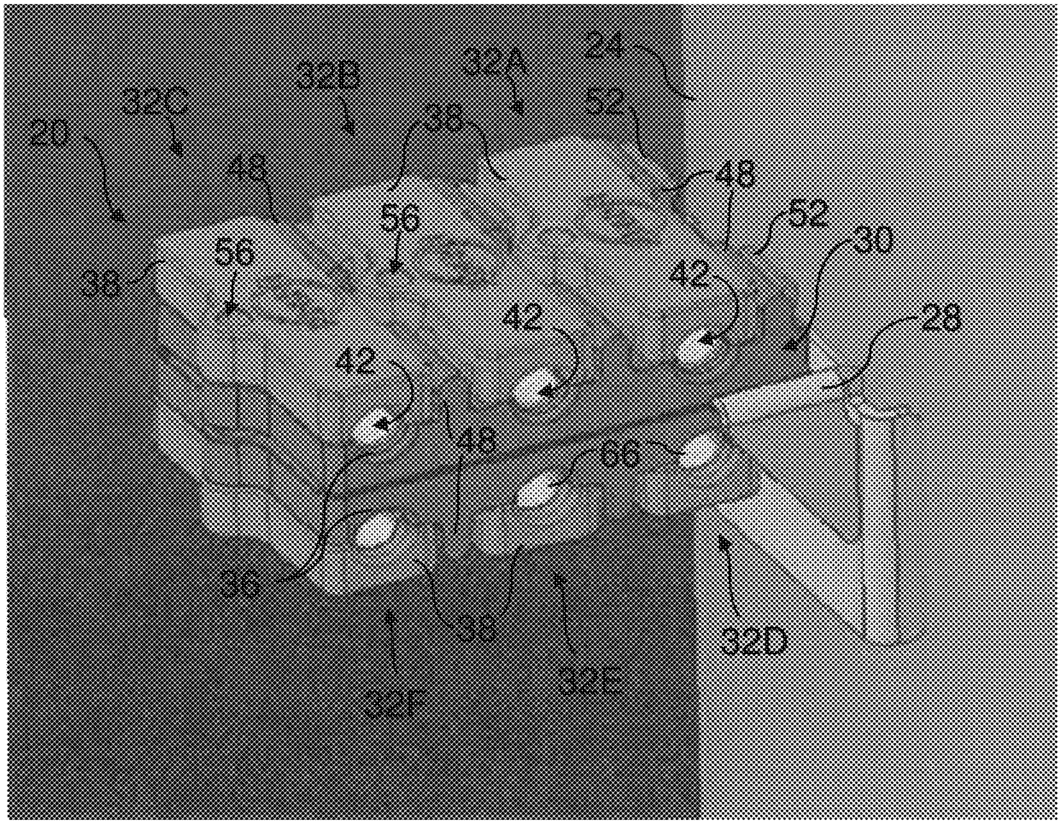
FIG. 2 is a perspective illustration of an example fiber tangent clamp, in accordance with some aspects of the present disclosure, which may hold plural cables, with the clamp attached to an example utility pole and oriented to have a general horizontal major extent.
Figure 3:
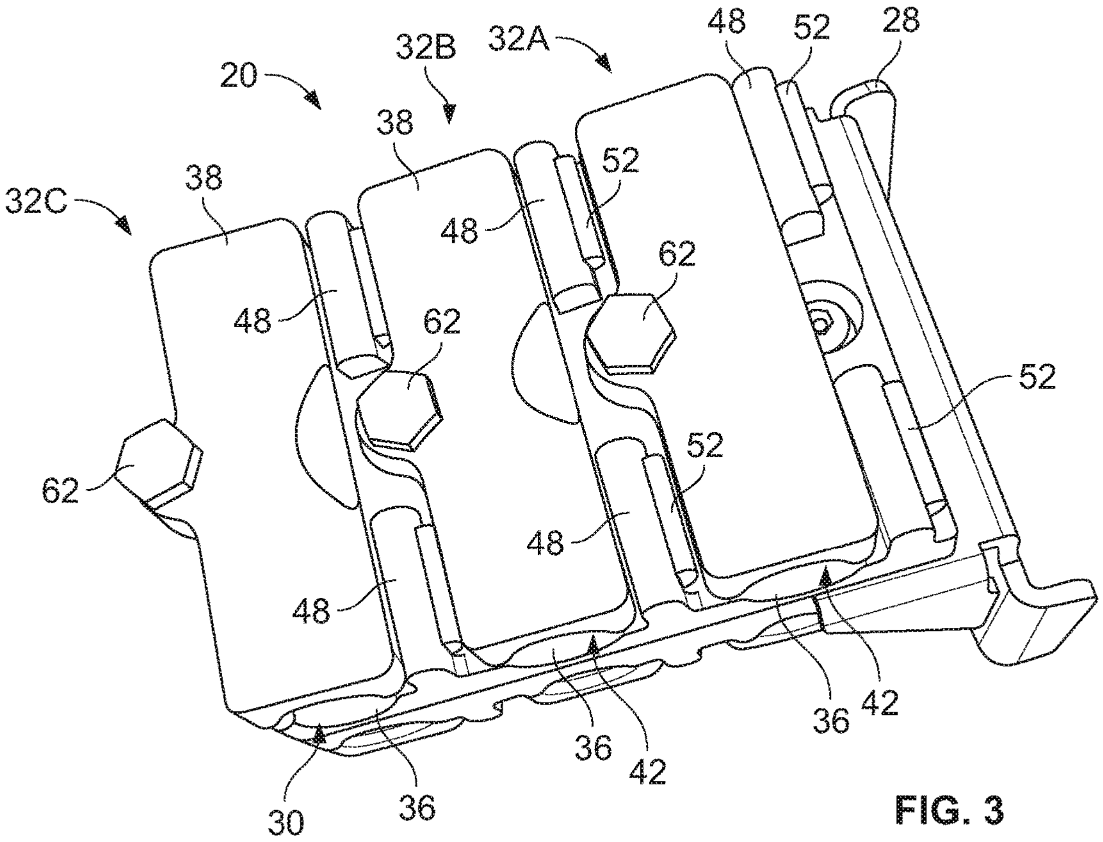
FIG. 3 is a perspective picture of the example cable tangent clamp of FIG. 2, and shows some clamping portions to retain respective cables within respective clamping portions.
Figure 4:
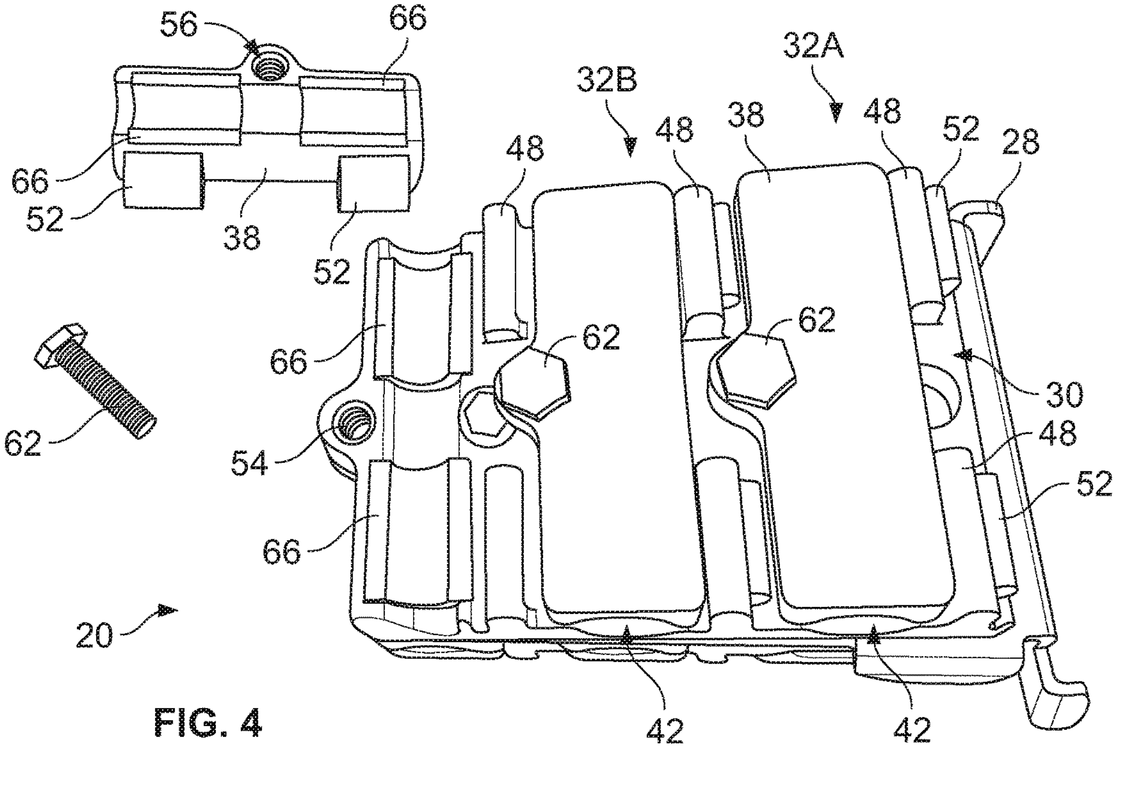
FIG. 4 is a perspective picture of the example cable tangent clamp of FIG. 3, but with one movable member of a clamping portion moved (e.g., removed) and the respective clamping portion partially disassembled to show structures within the respective clamping portion.
Figure 5:
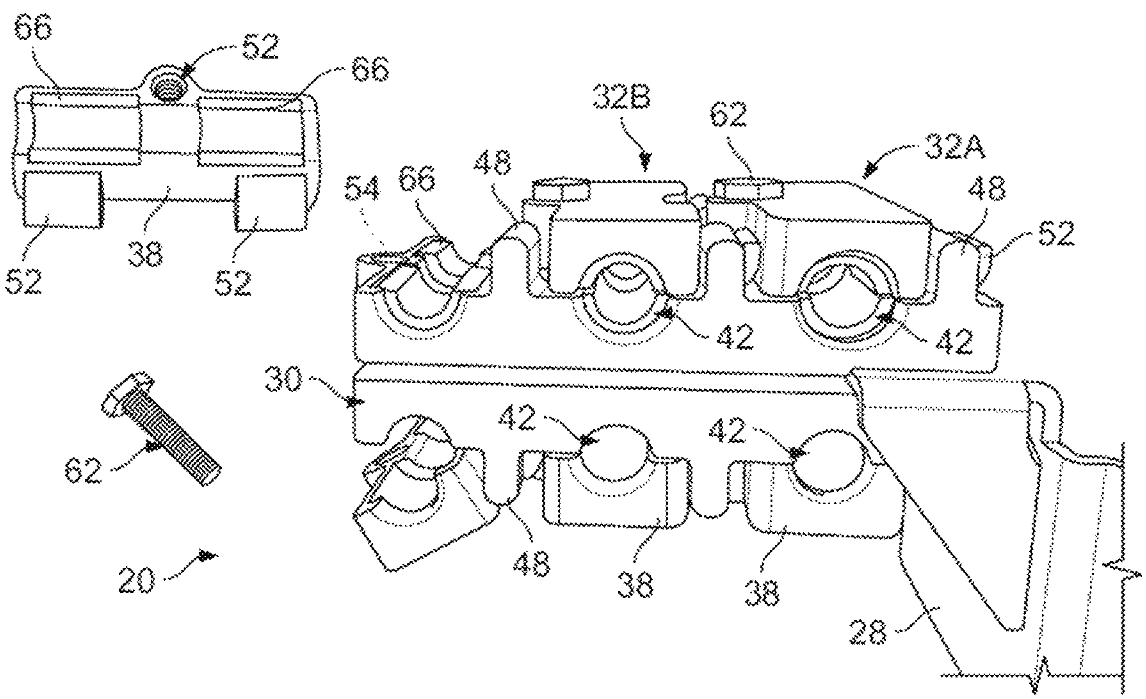
FIG. 5 is a side-view picture of the example cable tangent clamp of FIG. 3, but with one movable member removed and the respective clamping portion partially disassembled and another respective clamping portion partially open, via movement of a movable member, to show respective cable pathways through the clamp and to receive respective cables.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

The present disclosure provides clamps that may be utilized to hold suspended cables (e.g., lines). Within some examples, such held, suspended cables are fiber optic cables. The present disclosure provides holding clamps that are tangent clamps and thus may be referred to as fiber tangent clamps.

The tangent clamps that may hold multiple cables (e.g., fiber optic cables). Moreover, the tangent clamps may allow addition, or even subtraction of cable(s) at a later date. Such may occur without disturbing existing held cables.

Also, the tangent clamps allow for minimizing, possibly down to one, the number fasteners (e.g., bolts) needed to attach each clamp to a structure (e.g., utility pole). It is to be appreciated that it is possible that the structures (e.g., utility poles) to which the clamps are attached for cable (e.g., line) suspension may not be owned by the owner of the cables being attached to such structures. It is possible that leasing, rental or the like (e.g., cost) for the right to attach clamps for cable suspension is needed. Costs may vary for several reasons, possibly including number of supported clamps that are attached, the number of attachment devices (e.g., fasteners) extending to/into such structures, etc. So, minimizing costs is useful. Thus, the present disclosure provides that it would be better if new cables could be added without affecting the existing cables. Supports may include brackets that are attached to poles (e.g., utility poles), buildings and other structures. One aspect is to provide a tangent support clamp that has individual cable slots with holding mechanisms that are independent of each other. When adding or removing a cable from the clamp, the other cables can remain in place and remain under tension. This clamp may be designed to accept a variety of round and flat drops as well as larger diameter distribution cables.

It is to be appreciate that, in one or more examples, the present disclosure provides a tangent clamp for holding multiple cables. The clamp includes a body portion to attach the clamp to a structure and to permit cables to proceed along a tangential direction relative to the attachment of the clamp to the structure. The clamp includes at least one clamping portion supported upon the body portion. Each of the at least one clamping portion is to support a respective one of the cables. Each of the at least one clamping portion has a segment to support, such as to grip and retain, the respective one of the cables while the respective at least one clamping portion is in a respective actuated condition. The clamp includes at least one additional clamping portion supported upon the body portion. Each of the at least one additional clamping portion is to support a respective one of the cables. Each of the at least one additional clamping portion has a segment to support, such as to grip and retain, the respective one of the cables while the respective at least one clamping portion is in a respective actuated condition. The at least one additional clamping portion is separately actuatable to the respective actuated condition without a change of the respective actuated condition of the at least one clamping portion. A clamping portion can similarly be placed in an unactuated condition, whereby a respective cable can be removed from the clamping portion, independently of an actuated and/or unactuated condition of another and/or any other clamping portion.

Also it is to be appreciate that, in one or more examples, the present disclosure provides a tangent clamp to hold multiple cables. The tangent clamp includes a body to be supported by a structure and to permit cables to proceed along a tangential direction relative to the structure. The tangent clamp includes at least one clamping portion provided upon the body. Each of the at least one clamping portions to support a respective one of the cables. Each of the at least one clamping portion has a segment to support, such as to grip and retain, the respective one of the cables while the respective at least one clamping portion is in a respective actuated condition. The tangent clamp includes at least one additional clamping portion provided upon the body. Each of the at least one additional clamping portion to support a respective one of the cables. Each of the at least one additional clamping portion has a segment to support, such as to grip and retain, the respective one of the cables while the respective at least one clamping portion is in a respective actuated condition. The at least one additional clamping portion is separately actuatable to the respective actuated condition without a change of the respective actuated and/or unactuated condition of the at least one clamping portion.

Also it is to be appreciate that, in one or more examples, the present disclosure provides a tangent clamp to hold multiple cables. The tangent clamp includes a body to be supported by a structure and to permit cables to proceed along a tangential direction relative to the structure. The tangent clamp includes a plurality of separately actuatable clamping portion provided upon the body, with each of the at least one clamping portion to support a respective one of the cables.

Also it is to be appreciate that, in one or more examples, the present disclosure provides a tangent clamp to hold multiple cables. The tangent clamp includes a body to be supported by a structure and to permit cables to proceed along a tangential direction relative to the structure. The tangent clamp includes at least one actuatable clamping portion provided upon the body, with the body configured to permit additional actuatable clamping portion provided upon the body.

FIG. 1 shows an existing tangent clamp 10 that is capable of receiving and holding a single cable 12 (e.g., a fiber optic cable). Note that the single clamp 10 is attached, via an unseen fastener (e.g., a bolt), to a utility pole 14, which is an example of a structure. If another cable is desired to be help at the utility pole, a second, separate clamp would need to be attached to the utility pole. So, a second separate fastener would need to be applied to the utility pole for the second clamp.

The present disclosure addresses a topic of addition or subtraction of cable(s) without the need for disturbing a current status (e.g., a cable already in place). Also, the present disclosure addresses a topic of multiple cables that are supported at an elevated location of a structure (e.g., a utility pole) via a single fastener location. The present disclosure also addresses a topic of adding, subtracting or otherwise working upon one cable among plural cables.

It is to be appreciated that cable for which a tangent clamp (e.g., clamp 20, FIGS. 2-5) may be used be varied and thus need not be a specific limitation upon the present disclosure. The cables may be of any type, configuration, etc. Such cables may be for communication, data transmission or similar. The cables may be fiber optic.

It is to be appreciated that the elevated location at which a tangent clamp (e.g., clamp 20, FIGS. 2-5) suspends the cable(s) may be varied. For example, the elevated location may be at a pole (e.g., a utility pole), a building or other structures. Such elevated location may simply be considered to be at or on a structure (e.g., 24, see FIG. 2).

It is possible that the structure (24, e.g., a utility pole) to which a tangent clamp (e.g., clamp 20, FIGS. 2-5) is attached for cable suspension may not be owned by the owner of the cable(s) being suspended relative to such structure. It is possible that leasing, rental or the like (e.g., cost-incurring activity) for the right to attach to structure(s) (e.g., utility poles) for line suspension is needed. Costs may vary for any of several reasons, possibly including number of bracket(s) that are attached, the number of attachment(s) (e.g., fastener(s)) to/into such structure(s), etc. So, in accordance with some aspects of the present disclosure, a tangent clamp according to some aspects of the present disclosure has some aspect(s) or the like that may help alleviate/mitigate such an issue.

It is to be appreciated that some sequential reference numeral numbering progression is used herein to identify similar structures among the several examples. Specifically, each next, sequential example utilizes the same, repeated suffix portion of a reference numeral for a similar structure. However, a sequential prefix digit of the reference numeral is increased for each sequential example embodiment that is presented.

Referring specifically now to FIGS. 2-5, an example of a tangent clamp 20 for suspending multiple cables at a single elevated location (e.g., upon a structure 24, such as a utility pole) is shown. As such, the clamp 20 may support multiple cables at the single elevated location. As described further following, the example tangent clamp 20 may support up to six cables. However, a different number (i.e., different from six) is contemplated and within the scope of the present disclosure.

The clamp 20 include a bracket 28 that may be attached to the example structure (utility pole) 24 via a single fastener (e.g., a bolt, a banding strap, etc., not shown). A body 30 is connect to, or even unitary with, the bracket 28. As such, the body 30 is supported (e.g., fixed) relative to the structure (utility pole) 24. Thus, with such support by the structure cables supported by the clamp 20 may proceed along a tangential direction relative to the structure.

It is to be appreciated that the body 30 may have variations. For example, the body 30 may be a single, monolith piece or the body may be provided via plural (e.g., two or more) sub pieces. A specific example may be providing the body 30 as two halves that mate together. For such an example, the two halves may be located on each of two sides of a portion of the bracket 28, such that the portion of the bracket is "sandwiched" between the two halves.

Within the shown example, the clamp 20 includes six cable clamping portions 32 (32A-32F) provided upon the body 30. Of course, it is to be appreciated that a different number (i.e., a different number than six) of clamping portions 32 is possible, contemplated and within the scope of the present disclosure. It is to be appreciated that the clamping portions 32 may have varied constructions/configurations. Within the shown example, each clamping portion 32 is partially provided by a respective segment 36 of the body 30, which is generally shaped as a generally hemicylindrical trough or groove. So, the example of FIGS. 2-5 is an example of an embodiment that has at least one of plural clamping portions that includes at least one segment that is integral with the body. Of course, the example of FIGS. 2-5 is an example of an embodiment that has a plurality of separately actuatable clamping portions associated with such body.

Each clamping portion 32 is also partially provided by a respective relatively movable member 38 that has a mating generally hemicylindrical trough or groove. It is to be appreciated that as used herein, the term "movable" may include a variety of possible movements, movement types, and specifically may include removing and/or moving to install as a movement. When the movable member 38 is mated to the respective segment 36 of the body 30, a generally cylindrical pathway 42 is provided to receive a respective cable and clamp the respective cable therein. Within an example, the movable members may be referred to as latches.

It is to be appreciated that the type, construction, details, etc. of each clamping portion (e.g., 32 of the example of FIGS. 2-6, and all other examples within the present disclosure) may be varied and the specifics of the examples need not be specific limitations upon the present disclosure. As such, for all examples, each clamping portion is broadly stated to be provided upon the body, with an understanding that variations are contemplated and within the scope of the present disclosure.

Each movable member 38 and the body 30 may have a variety of structure(s) to permit the relative movement of the movable member relative to the body. See the example shown in FIG. 5 in which shows one moveable member 38 removed from the body 30 and another moveable member relatively pivoted/titled relative to the body. Also, there may be a variety of components/structures to provide for a tightening/retention of each movable member 38 to the body 30.

Within the shown example of FIGS. 2-5, each movable member 38 and the body 30 have a cooperative hinge arrangement to permit movement. For such hinge arrangement within the shown example, the body 30 has loops 48 and the moveable member 38 has complementary hooks 52 that seat into the loops. The movable member 38 may pivot/tilt about the hook and loop interaction location. As such the movable member 38 is movable between an open condition of the clamping portion 32 and a closed condition of the clamping portion of the clamp 20. As one example, the pivoting range may be approximately 90°. Of course, such a range is only an example and need not be a specific limitation and other movement ranges are possible. Also, the hooks 52 and loops 48 may be sized/configures to provide a snap-fit type connection that may help retain a respective moveable member 38 attached. Such may help prevent dropping/loss of a moveable member 38.

In the open condition of the clamping portion 32, a respective cable may be placed into, removed from and/or axially adjusted relative to the clamping portion of the clamp 20. In the closed condition of the clamping portion 32, the clamping portion is to provide a clamping force to the respective cable so as to retain/hold the cable relative to the clamp 20. Such clamping to retain/hold is discussed further following.

Within the shown example of FIGS. 2-5, the body 30 has an embedded/internal threaded segment 54 (see FIG. 4) associated with each clamping portion 32. Each movable member 38 has a through hole 56 that aligns with the respective threaded segment 54 of the body 30 as the clamping portion 32 is moved toward the closed condition. A fastener (e.g., a threaded bolt, a 90° twist lock, etc.) 62 extends through the through hole 56 and into engagement with the threaded segment 54. Tightening of the fastener (e.g., bolt) 62 moves the movable member 38 such that the clamping portion 32 tightens onto the respective cable therein.

In summary, when a respective cable is within a respective clamping portion (e.g., 32A) and the fastener is tightened to hold the cable, the clamping portion can be considered to be actuated in an actuated condition, etc. Of course, actuation of a clamping portion 32 to hold/retain a cable is to be broadly interpreted. Actuation is dependent upon the particular construction/configuration and associated methodology variation. Similarly, an unactuated condition, etc. of a clamping portion allows a cable to be removed from the clamping portion, and is likewise dependent upon the particular construction/configuration and associated methodology variation, etc. Such broad interpretation/variation is applicable to all of the presented examples and is thus within the scope of the present disclosure.

Thus, it is to be appreciated that each clamping portion (e.g., 32A), which is provided upon the body 30, may support a respective one of the cables. Each clamping portion (e.g., 32A) has at least a segment (e.g., the troughs and possibly cushions therein) to grip and retain the respective one of the cables while the respective clamping portion is in the actuated condition. It is to be further appreciated that the separation of the plural clamping portions 32, provides useful benefits. For example, for each additional clamping portion provided upon the body, such additional clamping portion is separately actuatable (e.g., from an unactuated condition whereby a cable is not gripped and/or retained) to its respective actuated condition (e.g., where a cable is gripped and/or retained) without a change of the respective actuated and/or unactuated condition of the other clamping portion(s). Such broad concept is equally applicable to the other, various examples provided within the present disclosure. Such is so, even with variations, etc. that are provided by the other examples.

Focusing again upon the example of FIGS. 2-5, it is to be appreciated that use of a single fastener (e.g., bolt) 62 for each clamping portion 32 may be useful, fast and efficient. For example, use of a single fastener may make cable installation and removal an easy procedure. However, a different number of fasteners 62 may be used for each clamping portion 32. Also, although it is shown within FIG. 4 that the example fastener (e.g., bolt) 62 is removable, it is contemplated that the fastener may be provided within a capture (i.e., anti-removal) arrangement. Such may help prevent lost or dropped hardware.

It is to be appreciated that the bracket 28, the body 30 and movable members 38 of the clamp 20 are each made of suitable materials. Examples of such materials include metals, rigid plastics, other rigid materials, pliable/resilient materials, rubbers, elastomers and combinations thereof. The bracket 28, the body 30 and movable members 38 of the clamp 20 may be made by injection molding, casting, stamping or any other suitable method. The fasteners 62 may be may of metal or other suitable material.

Within the shown example of FIGS. 2-5, each clamping portion 32 includes resilient/pliable cushions 66 so as help present damage to the respective cable therein. The resilient/pliable cushions 66 are made of suitable material(s), such rubber, polymers, other flexible/pliant materials and combinations thereof. Within the shown example of FIGS. 2-5, the cushions 66 are segments having a hemicylindrical shape. Also within the shown example of FIGS. 2-5, the body 30 and the movable members 38 include recess segments within the respective hemicylindrical troughs to receive and retain the cushions 66.

It is to be noted that selection of some materials and other factors may be part of a process to make other determinations. For example, if the body and/or movable members are made of pliable/resilient materials, rubbers, elastomers and combinations thereof, separate cushions may not be needed. In general, it is to be appreciated that variations/examples regarding materials, variations of fasteners, variations regarding mounting to structure, methods of making, etc., are applicable to all of the examples provided within the present disclosure.

Within the shown example clamp 20 of FIGS. 2-5, it is to be appreciated that the plural (e.g., six) cable clamping portions 32 (32A-32F) are arranged in two rows of three clamping portions within each row (i.e., a two row and three column matrix). As such, the clamp 20 may be considered to have a general horizontal arrangement of clamping portions 32 because of the major extent (i.e., three) is along the horizontal direction, as compared to the minor extent (i.e., two) being along the vertical direction. Thus, with six held cables, such cables may also be considered to have a general horizontal arrangement.

Of course, different orientations and/or configurations of the clamping portions are contemplated and are within the scope of the present disclosure. An example of such a difference is shown with the example clamp 120 of FIG. 6. For this example, the number of clamp portions 132 (132A-132F) is the same as the example shown within FIGS. 2-5. However, the clamp portions 132 are arranged in a general vertical matrix arrangement. Specifically, there are three rows of two clamping portions within each row (i.e., a three row and two column matrix). The body 130 of the clamp 120 is fixed and supported upon a bracket 128 so as to provide the generally vertical orientation.

Figure 6:
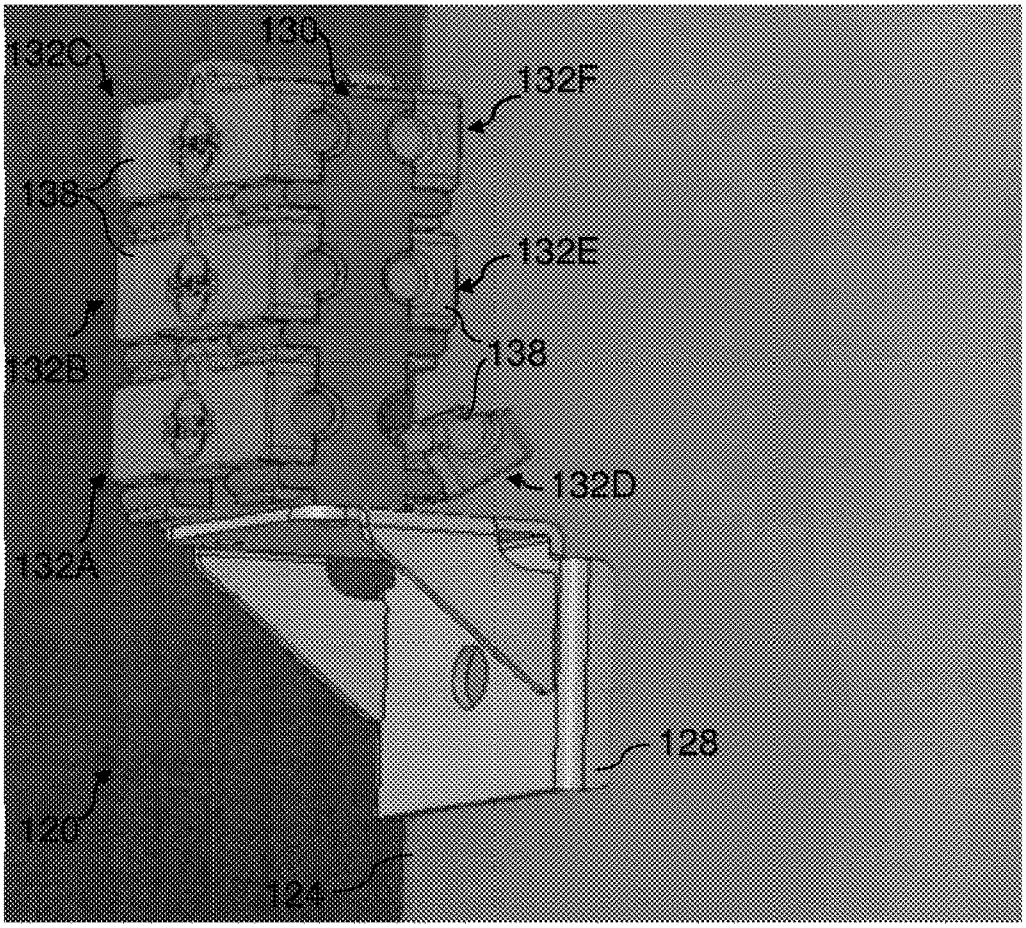
FIG. 6 is a perspective illustration of another example cable tangent clamp, in accordance with some aspects of the present disclosure, which may hold plural cables, with one respective clamping portion partially open, via movement of a respective movable member, to receive a respective cable and with the clamp oriented to have a general vertical major extent.

It is to be appreciated that the example clamp 120 of FIG. 6 may have similar components, portions, etc. as compared to the example clamp of FIGS. 2-5. It is to be appreciated that a sequential reference numeral numbering progression is used herein to identify similar structures. Specifically, the reference numerals have a repeated suffix portion of a reference numeral for a similar structure. However, a sequential prefix digit of "1" is provided for the reference numerals for the example of FIG. 6. Many descriptions provided example clamp 20 of FIGS. 2-5 are similarly applicable to the example clamp 120 of FIG. 6, and thus reference is to be made thereto. In short summary, the example clamp 120 of FIG. 6 has at least the following: bracket 128, body 130, cable clamping portions 132 (132A-132F), and movable members 138, which have structure(s), functions, operations, etc. as the comparable portions of the example clamp 20 of FIGS. 2-5. So, the example of FIG. 6 is an example of an embodiment that has at least one of plural clamping portions that includes at least one segment that is integral with the body. Of course, the example of FIG. 6 is an example of an embodiment that has a plurality of separately actuatable clamping portions associated with such body.

The example clamp 120 may be attached/secured onto a structure (e.g., a utility pole) 124 at the bracket 128, similar to the attachment/securing of the example clamp 20 of FIGS. 2-5. For example, a single fastener (e.g., a bolt) may be used to secure the example clamp 120. Again, it is to be understood that discussions regarding one example will have applicability to other examples.

In particular, when a respective cable is within a respective clamping portion (e.g., 132A) and the fastener is tightened to hold the cable, the clamping portion can be considered to be actuated, in an actuated condition, etc. Of course, actuation of a clamping portion 132 to hold/retain a cable is to be broadly interpreted. Actuation is dependent upon the particular construction/configuration and associated methodology variation. Similarly, an unactuated condition, etc. of a clamping portion allows a cable to be removed from the clamping portion, and is likewise dependent upon the particular construction/configuration and associated methodology variation, etc. Such broad interpretation/variation is within the scope of the present disclosure.

Thus, it is to be appreciated that each clamping portion (e.g., 132A), which is provided upon the body 130, may support a respective one of the cables. Each clamping portion (e.g., 132A) has at least a segment (e.g., the troughs and possibly cushions therein) to grip and retain the respective one of the cables while the respective clamping portion is in the actuated condition. It is to be further appreciated that the separation of the plural clamping portions 132, provides useful benefits. For example, for each additional clamping portion provided upon the body, such additional clamping portion is separately actuatable (e.g., from an unactuated condition whereby a cable is not gripped and/or retained) to its respective actuated condition (e.g., where a cable is gripped and/or retained) without a change of the respective actuated and/or unactuated condition of the other clamping portion(s). Such broad concept is equally applicable to the other, various examples provided within the present disclosure. Such is so, even with variations, etc. that are provided by the other examples.

As mentioned, the number of clamp portions within a clamp may be varied. Thus, although the examples of FIGS. 2-6 each have six clamp portions, a different number of clamp portions may be provided. It is to be appreciated that one approach is to make the respective body have a different (i.e., different than six) number of troughs and provided an associated number of movable members. However, it is to be appreciated that different methods/approaches of providing a different number of clamp portions are contemplated and within the scope of the present disclosure. An example of such a different method/approach is shown within FIG. 7.

Figure 7:
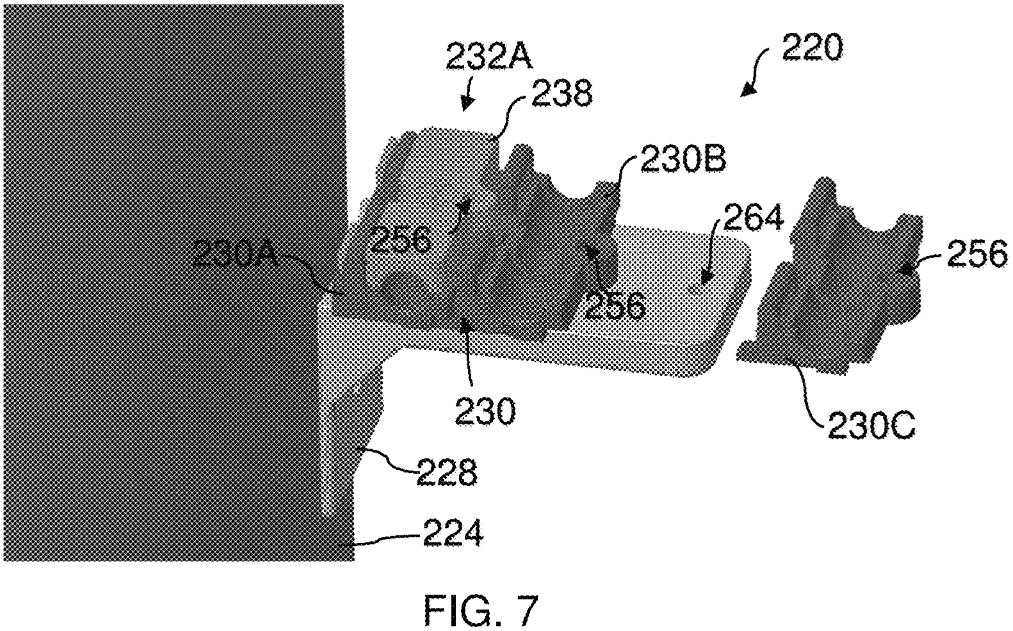
FIG. 7 is a perspective illustration of another example cable tangent clamp, in accordance with some aspects of the present disclosure, which may hold plural cables and in which respective clamping portions are modular and may be added or subtracted from the overall clamp.
Figure 8:
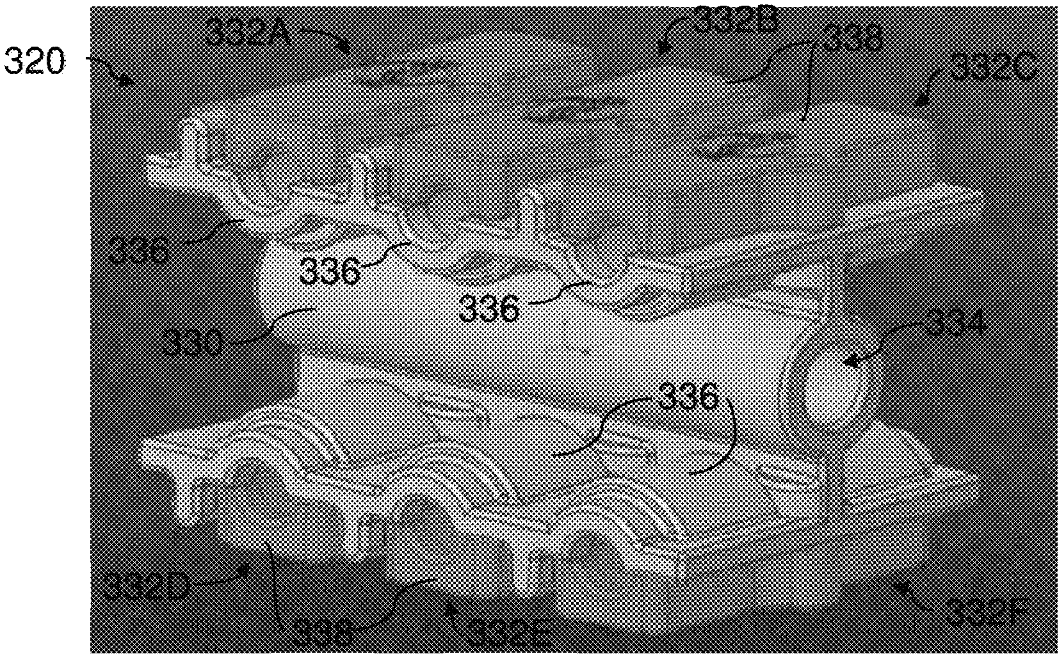
Figure 9:
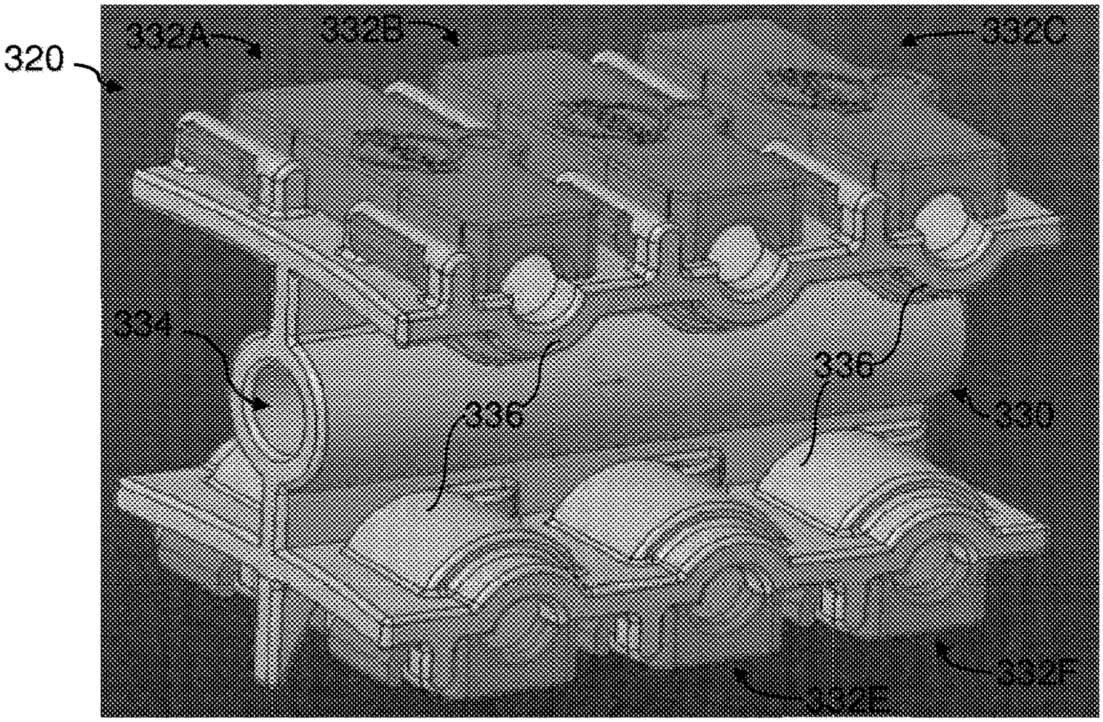
FIG. 9 is a reverse-angle perspective illustration of the example cable tangent clamp of FIG. 8.
Figure 10:
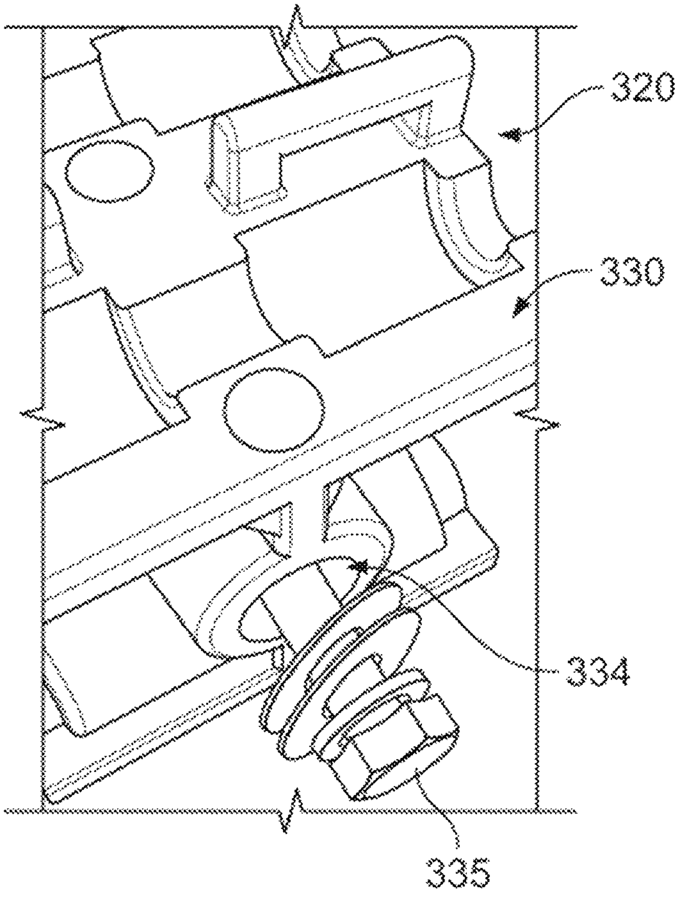
FIG. 10 is a picture of a portion of the example cable tangent clamp of FIG. 8, with respective clamping portions disassembled and showing an example fastener.
Figure 11:
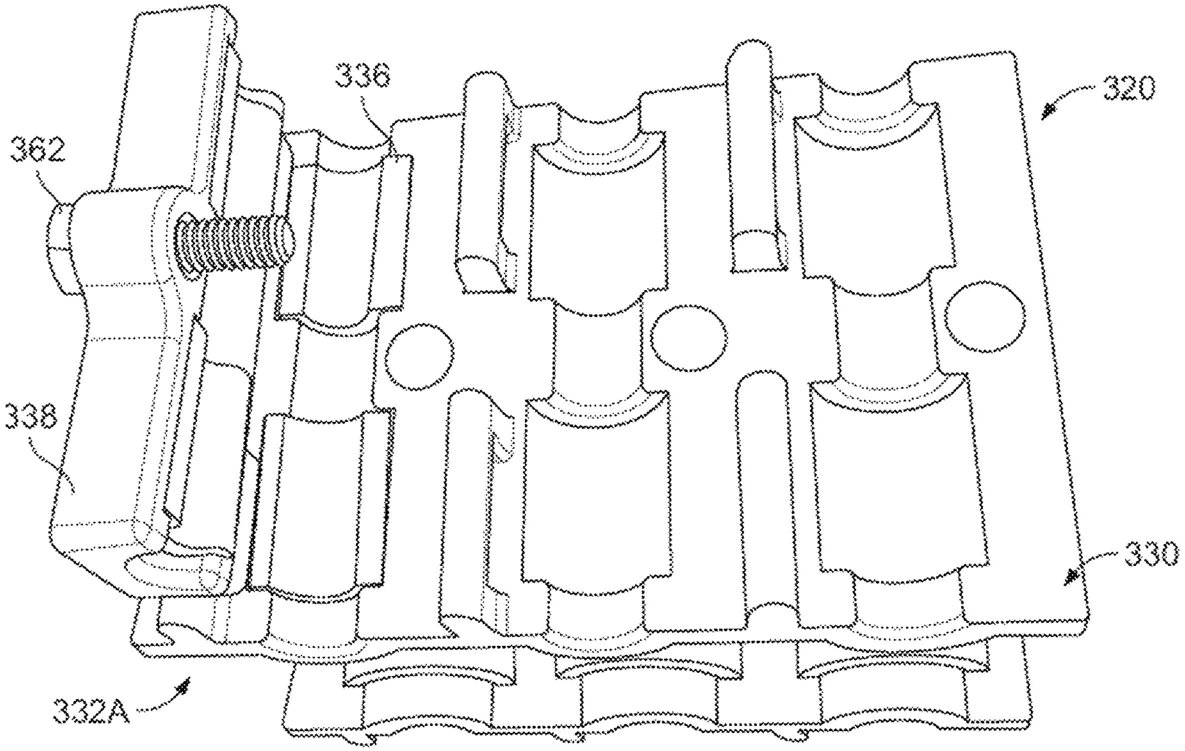
FIG. 11 is a picture of the example cable tangent clamp of FIG. 8, with some respective clamping portions disassembled and one clamping portion open, via movement of the respective movable member, so as to receive a cable therein.

A clamp 220 of FIG. 7 includes a bracket 228 for attaching the clamp of a structure (e.g., a utility pole) 224. However, a body 230 of the clamp has an additive configuration. Specifically, the body 230 has body segments (e.g., 230A, 230B, 230C), with each segment providing one trough. A movable member (e.g., 238A) is associated with and coupled to the respective body segment (e.g., 230A) to provide for clamping of one respective cable. Each successive body segment (e.g., 230B), and associated movable member 238, provides for clamping of a respective additional cable. So, the example of FIG. 7 is an example of an embodiment that has at least one of plural clamping portions that includes at least one segment that is integral with the body, and specifically a segment of the body. Of course, the example of FIG. 7 is an example of an embodiment that has a plurality of separately actuatable clamping portions associated with such body.

Within FIG. 7, the example shows a first body segment 230A, and associated movable member 238, upon the bracket 228. A second body segment 230B is already in place upon the bracket 228 next to the first body segment 230A. A third body segment 230C is exploded away from the bracket 228. As such, the third body segment 230C may be in the process of being added to the first and second body segments 230A, 230B upon the bracket 228 (or may even be in the process of being removed away from the bracket if no longer needed).

Within the shown example of FIG. 7, each body segment (e.g., 230A) and respective movable member 238 have respective pass-through holes 256 and 258. When the respective movable member 238 is upon the respective body segment (e.g., 230A) and the respective movable portion is moved to a closed condition, the respective holes 256, 258 are axially aligned. A fastener (not shown within FIG. 7) extends though both pass-through holes 256, 258 and engages a respective threaded opening 264 in the bracket 228. Thus, the fastening function to secure/tighten the movable member 238 to the respective body portion (e.g., 230A) also fixes both of the body portion (e.g., 230A) and associated movable member 238 to the bracket 228. It is to be appreciated that the respective threaded openings 264 in the bracket 228 for the first and second body segments 230A, 230B are hidden beneath the first and second body segments 230A, 230B within FIG. 7.

The approach demonstrated via FIG. 7 is that a varying number of clamp portions (e.g., 232A) of the overall clamp 220 can be provided based upon the number of cables that need to be supported by the clamp. So, the number of body segments (e.g., 230A-230C) and associated movable members (e.g., 238) are each adjustable in number. Thus, as cables are added to a location, perhaps much later in time, the number of clamp portions (e.g., 232A) may be increased to accommodate. Similarly, it is also possible to decrease the number of clamp portions, if such is desired.

In summary, when a respective cable is within a respective clamping portion (e.g., 232A) and the fastener is tightened to hold the cable, the clamping portion can be considered to be actuated, in an actuated condition, etc. Of course, actuation of a clamping portion 232 to hold/retain a cable is to be broadly interpreted. Actuation is dependent upon the particular construction/configuration and associated methodology variation. Similarly, an unactuated condition, etc. of a clamping portion allows a cable to be removed from the clamping portion, and is likewise dependent upon the particular construction/configuration and associated methodology variation, etc. Such broad interpretation/variation is within the scope of the present disclosure.

Thus, it is to be appreciated that each clamping portion (e.g., 232A), which provided upon the body 230, may support a respective one of the cables. Each clamping portion (e.g., 232A) has at least a segment (e.g., the troughs and possibly cushions therein) to grip and retain the respective one of the cables while the respective clamping portion is in the actuated condition. It is to be further appreciated that the separation of the plural clamping portions 232, provides useful benefits. For example, for each additional clamping portion provided upon the body, such additional clamping portion is separately actuatable (e.g., from an unactuated condition whereby a cable is not gripped and/or retained) to its respective actuated condition (e.g., where a cable is gripped and/or retained) without a change of the respective actuated and/or unactuated condition of the other clamping portion(s). Such broad concept is equally applicable to the other, various examples provided within the present disclosure. Such is so, even with variations, etc. that are provided by the other examples.

The examples shown within FIGS. 2-7 show that possibility of using a bracket to attach the clamp to a structure (e.g., a utility pole). However, it is contemplated, and thus within the scope of the present disclosure, that different constructions/methodologies may be used to attach clamps to structures. FIGS. 8-11 show an example of a different attachment construction/methodology for a clamp 320. A body 330 of the clamp 320 has a through-bore 334 that may receive a fastener (e.g., a bolt) 335 (see FIG. 10) therethrough. The fastener (e.g., bolt) 335 is to secure into the structure (e.g., utility pole).

Other portions of the clamp 320 may be similar to other examples of clamps presented within the present disclosure. The body 330 of the example clamp 320 of FIGS. 8-11 has respective segments 336 that are generally shaped as generally hemicylindrical troughs or grooves to receive respective cables. So, the example of FIGS. 8-11 is an example of an embodiment that has at least one of plural clamping portions that includes at least one segment that is integral with the body. Of course, the example of FIGS. 8-11 is an example of an embodiment that has a plurality of separately actuatable clamping portions associated with such body.

Also, the example clamp 320 has movable members 338, each with a hemicylindrical trough to receive a respective cable, and cushions 366 (see FIG. 11) that are similar to those of the examples of FIGS. 3-6. As such, clamping portions 332 (332A-332F) are provided and function similar to the previously discussed clamp portions. For example, a fastener (e.g., a bolt 362, see FIG. 11) is to secure and tighten each clamping portion (e.g., 332A) onto a respective cable. Although six clamp portions 332A-332F are shown within the example clamp 320 of FIGS. 8-11, variations to have different numbers (i.e., different from six) of clamp portions are contemplated and within the scope of the present disclosure.

It is to be appreciated that the shown example may have six movable members 338. It is to be appreciated that if the overall clamp 320 is initially installed to retain/hold fewer than six cables, it is optional to provide all six movable members 338 at such time. If fewer than six is desired at the time of initial installation, additional movable member(s) 338 may be added as additional cables need retention/holding. Also, it is possible to remove unneeded movable members 338.

In summary, when a respective cable is within a respective clamping portion (e.g., 332A) and the fastener is tightened to hold the cable, the clamping portion can be considered to be actuated, in an actuated condition, etc. Of course, actuation of a clamping portion 332 to hold/retain a cable is to be broadly interpreted. Actuation is dependent upon the particular construction/configuration and associated methodology variation. Similarly, an unactuated condition, etc. of a clamping portion allows a cable to be removed from the clamping portion, and is likewise dependent upon the particular construction/configuration and associated methodology variation, etc. Such broad interpretation/variation is within the scope of the present disclosure.

Thus, it is to be appreciated that each clamping portion (e.g., 332A), which provided upon the body 330, may support a respective one of the cables. Each clamping portion (e.g., 332A) has at least a segment (e.g., the troughs and possibly cushions therein) to grip and retain the respective one of the cables while the respective clamping portion is in the actuated condition. It is to be further appreciated that the separation of the plural clamping portions 332, provides useful benefits. For example, for each additional clamping portion provided upon the body, such additional clamping portion is separately actuatable (e.g., from an unactuated condition whereby a cable is not gripped and/or retained) to its respective actuated condition (e.g., where a cable is gripped and/or retained) without a change of the respective actuated and/or unactuated condition of the other clamping portion(s). Such broad concept is equally applicable to the other, various examples provided within the present disclosure. Such is so, even with variations, etc. that are provided by the other examples.

Figure 12:
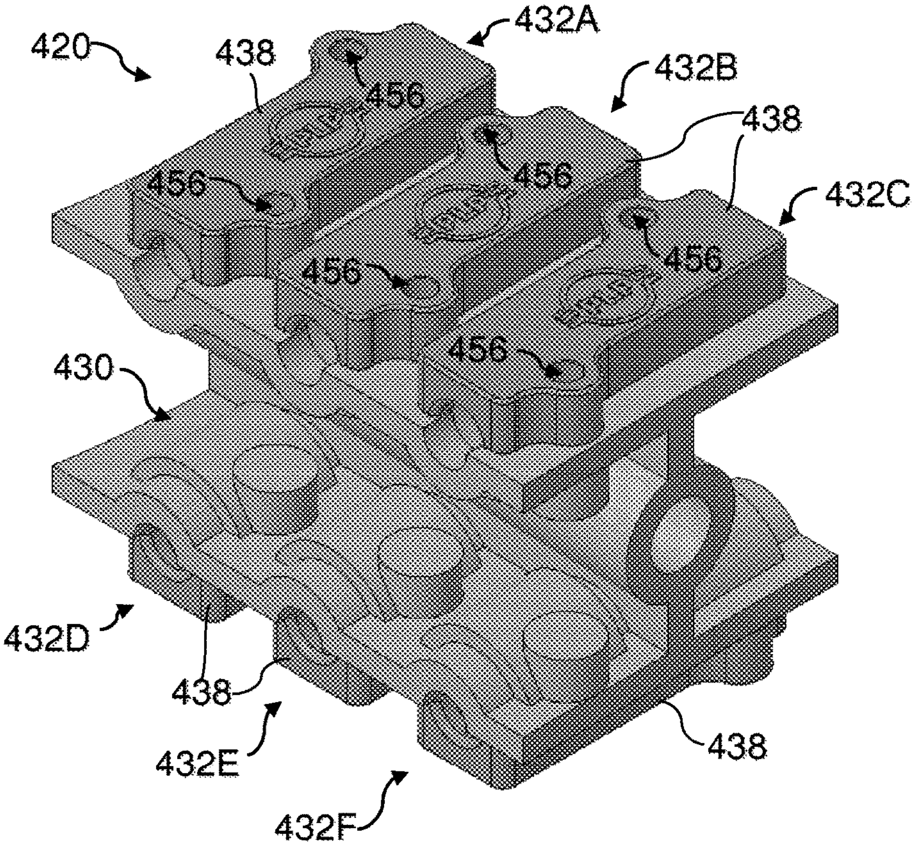
FIG. 12 is a perspective illustration of another example cable tangent clamp, in accordance with some aspects of the present disclosure, which is similar to the example shown within FIGS. 8-11, but having a structure variation for the clamping portions.

Of course, it is to be understood that the several examples presented within the present disclosure need not be specific limitations upon the present disclosure and that variations are contemplated and within the scope of the present disclosure. FIG. 12 provides an example of such variation.

Within the example clamp 420 shown in FIG. 12, the body 430 has hemicylindrical troughs, and each movable member 438 has a hemicylindrical trough, to receive respective cables. So, the example of FIG. 12 is another example of an embodiment that has at least one of plural clamping portions that includes at least one segment that is integral with the body. Of course, the example of FIG. 12 is an example of an embodiment that has a plurality of separately actuatable clamping portions associated with such body.

A cable may be clamped therebetween at each pair of troughs. As such clamp portions (e.g., six clamping portions 432A-432F are shown within the example) are provided. However, instead of a pivot connection (e.g., loop and hook) of the clamp of FIGS. 8-11, two fasteners (e.g., bolts, not shown) are utilized, with each movable member 438 having two through-holes 456 and the body has two respective threaded portions accordingly. The fasteners are tightened to retain and hold the respective movable member 438 and thus retain and hold the respective cable.

It is to be appreciated that the shown example has six movable members 438. It is to be appreciated that if the overall clamp 420 is initially installed to retain/hold fewer than six cables, it is optional to provide all six movable members 438 at such time. Additional movable member(s) 438 may be added as additional cables need retention/holding. Also, it is possible to remove unneeded movable members 438. Similar to the other examples, each respective clamping portion (e.g., 432A) is actuatable to hold/retain a cable and each respective clamping portion (e.g., 432B) is separately actuatable and/or unactuatable.

Figure 13:
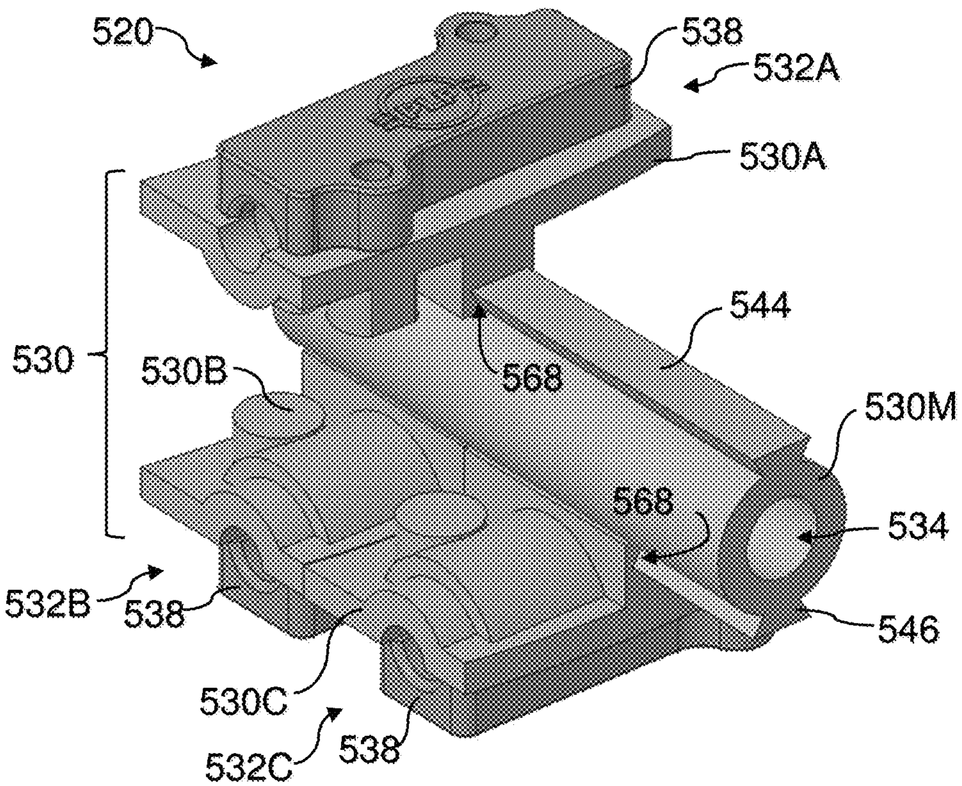
FIG. 13 is a perspective illustration of another example cable tangent clamp, in accordance with some aspects of the present disclosure, which may hold plural cables and in which respective clamping portions are modular so that the portions may be added or subtracted from the overall clamp.
Figure 14:
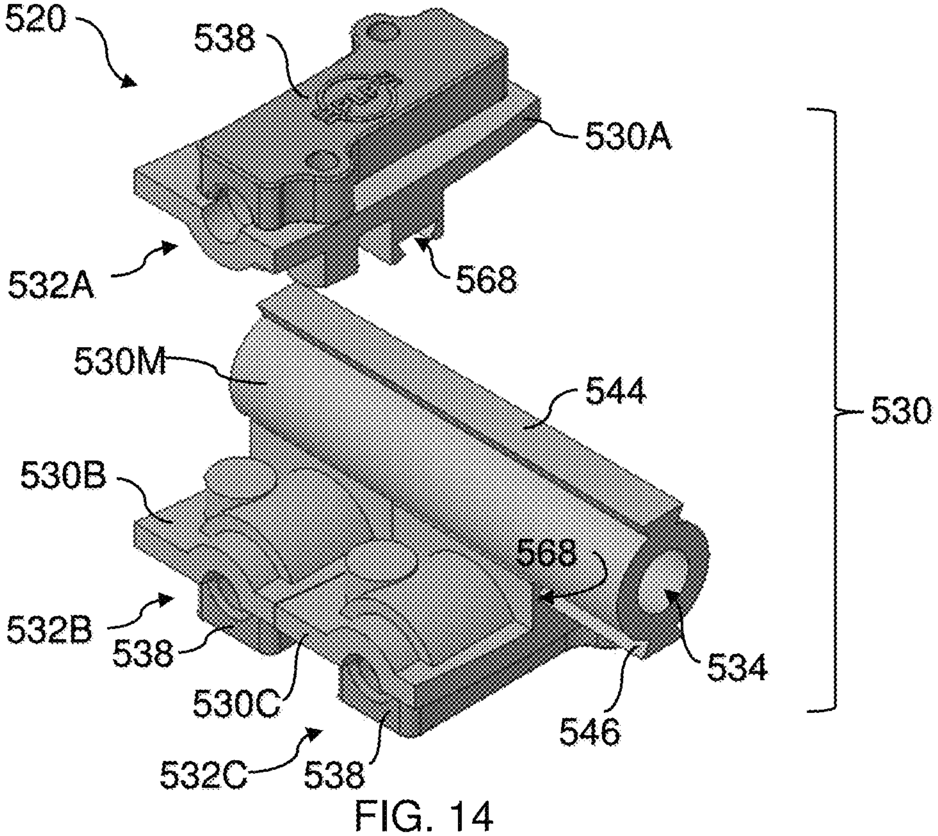
FIG. 14 is a partially exploded view of the example cable tangent clamp of FIG. 13, with two clamping portions added to the clamp and one clamping portion exploded away.

Again, it is to be understood that variations to all of the presented examples are contemplated and with the scope of the present disclosure. For example, FIGS. 13 and 14 show an example of a clamp 520 that has a body 530 with a through-bore 534 to permit attachment to a structure (e.g., a utility pole) via a fastener (e.g., a bolt, not shown). Such is similar to the examples of FIGS. 8-12. However, the clamp 520 has a similar method/approach to the example of FIG. 7 in that the body 530 has segments (e.g., 530A, 530B, 530C) that may be added or subtracted.

A main body segment 530M includes a portion containing the through-bore 534. Two dovetail rails 544, 546 are located along the main body segment. Each dovetail rail 544, 546 has an elongation extent that is parallel to an axial extent of the through-bore 534. One of the dovetail rails (e.g., 544) is located relatively above the through-bore 534 and the other of the dovetail rails (e.g., 546) is located relatively below the through-bore.

So to be clear, the example of FIGS. 13 and 14 is an example of an embodiment that has at least one of the plurality of separately actuatable clamping portions that is removably attached to the body. Or more specifically, the shown example has at least one of the plurality of separately actuatable clamping portions removably attached to a specific body segment (i.e., main body segment 530M), which can be considered to simply be a body. In other words, since the primary function of the segments 530A, 530B and 530C is clamping, it is possible to interpret only the main segment 530M as the body. Such interpretation is expressly presented herein. Of course, the example of FIGS. 13 and 14 is an example of an embodiment that has a plurality of separately actuatable clamping portions associated with such body.

Each of several (e.g., three shown within FIGS. 13 and 14) body segments (e.g., 530A, 530B, 530C) have complementary dovetail notches 568 that may mate with a respective dovetail rail 544 or 546. A moveable member 538 is associated with each body portion (e.g., 530A, 530B, 530C) so as to provide a respective clamping portion (e.g., 532A-532C). So, the number of clamping portions (e.g., 532A-532C) within the overall clamp 520 is dependent upon the number of body segments (e.g., 530A, 530B, 530C), with associated movable member 538, placed upon the dovetail rails 544, 546. Similar to the other examples, each respective clamping portion (e.g., 532A) is actuatable to hold/retain a cable and each respective clamping portion (e.g., 532B) is separately actuatable and/or unactuatable.

The examples of FIGS. 7, 13 and 14 show that the number of clamp portions of the overall clamp may be varied by adding or subtracting single clamp portion(s) to the clamp at a location (e.g., a mount location at a structure such as a utility pole). So, the examples of FIGS. 7, 13 and 14 are examples in which the number of body segments and associated movable members are each adjustable in number. However, again, it is to be appreciated that variations are contemplated and with the scope of the present disclosure. As an example of such scope of variation, it is within the scope of the present disclosure that groups of clamp portions may be added or subtracted from an overall clamp at a location (e.g., a mount location at a structure such as a utility pole).

Figure 15:
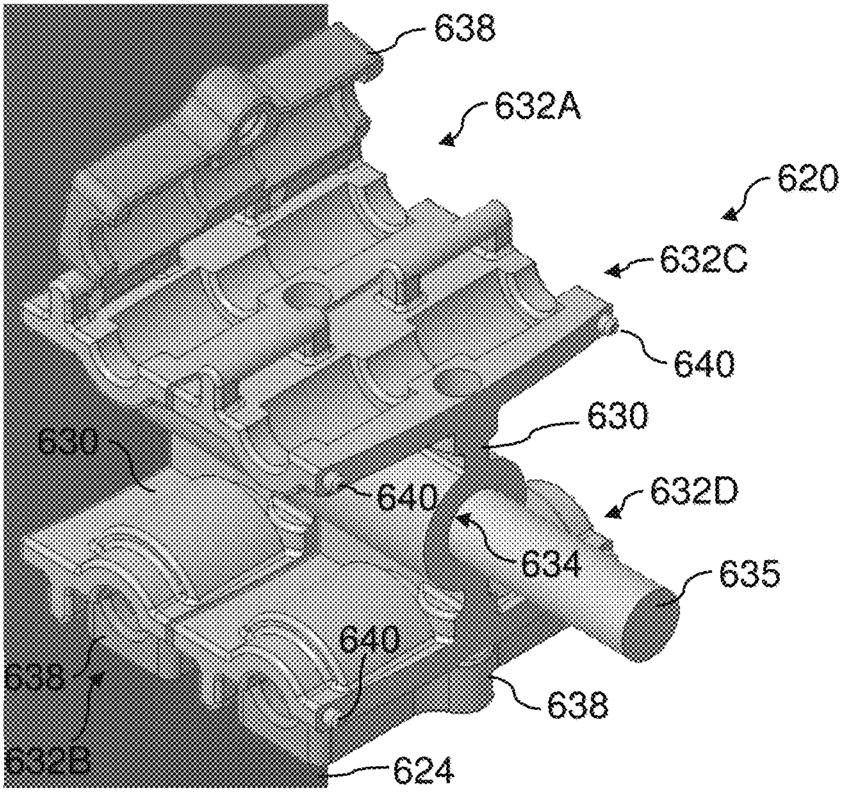
Figure 16:
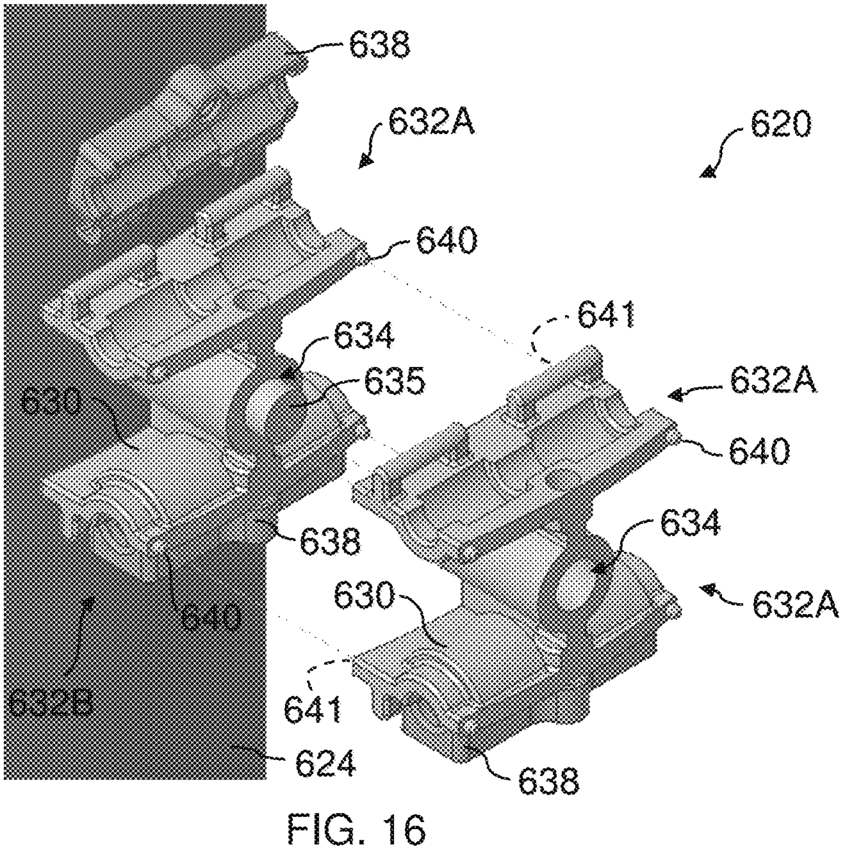
FIG. 16 is a partially exploded view of the example cable tangent clamp of FIG. 15, with one pair of clamping portions attached to a utility pole or the like via a schematic fastener, and another pair of clamping portions exploded away but which may be added to the overall clamp via removal and replacement of the shown fastener.

FIGS. 15 and 16 show an example clamp 620 in which multiple clamp portions (e.g., 632A-632D) are added or subtracted as a group. The specific example shows multiple clamp portions (e.g., 632A and 632D) are added or subtracted in pairs (i.e., two at a time, e.g., 632A and 632B, 632C and 632D). Each pair of clamp portions (e.g., 632A and 632B) includes a body portion 630, a first clamp portion (e.g., 632A) at an upper end of the body portion and a second clamp portion (e.g., 632B) at a lower end of the body portion.

So, the example of FIGS. 15 and 16 is another example of an embodiment that has at least one of plural clamping portions that includes at least one segment that is integral with the body. Of course, the example of FIGS. 15 and 16 is an example of an embodiment that has a plurality of separately actuatable clamping portions associated with such body.

A through-bore 634 extends through the body portion 630, similar to the examples shown within FIGS. 8-14. The first clamp portion (e.g., 632A) includes a hemicylindrical trough in the body portion 630, with the trough for receiving a respective cable. The body portion 630 also includes loops and an embedded threaded portion similar to the loops and embedded threaded portions shown within the examples of FIGS. 2-11. The first clamp portion (e.g., 632A) also includes a movable member 638. The movable member 638 includes a hemicylindrical trough for receiving the respective cable, hooks for engaging into the loops, and a through hole to permit a fastener to be tighten into the threaded portion. The troughs may include recesses and cushions may be provided. All of such may be similar to the corresponding structures within the previously discussed examples.

The second clamp portion (e.g., 632B) similarly includes a hemicylindrical trough in the body portion 630, with the trough for receiving a respective cable. The body portion 630 also includes loops and an embedded threaded portion similar to the loops and embedded threaded portions shown within the examples of FIGS. 2-11. The second clamp portion (e.g., 632B) also includes a movable member 638. The movable member 638 includes a hemicylindrical trough for receiving the respective cable, hooks for engaging into the loops, and a through hole to permit a fastener to be tighten into the threaded portion. The troughs may include recesses and cushions may be provided. All of such may be similar to the corresponding structures within the previously discussed examples.

It is to be appreciated that the overall clamp 620 with just the single pair of clamp portions (e.g., 632A and 632B) may be used. A fastener (e.g., a bolt, schematically shown) 635 of appropriate length may be used to secure such to a structure (e.g., a utility pole) 624. However, it is to be recalled that one or more subsequent pairs of clamp portions (e.g., (e.g., 632C and 632D) may be added. See that FIG. 16 shows that aspect of a subsequent pair of clamp portions (e.g., 632C and 632D) may be added. In comparison, FIG. 15 shows two pairs (i.e., a total of four) of clamp portions (e.g., 632A-632D) already within the overall clamp 620. It is to be noted that the fastener 635, for fastening the overall clamp 620 to the structure 624, is schematically shown. Such schematic rendering provides an indication that the overall clamp 620 containing the plural (e.g., two) pairs of shown clamp portions (e.g., 632A-632D) may be secured to the structure 624 to provide the overall clamp 620 or that one or more additional pairs of clamp portions may be added. Within an example, the fastener 635 may include a threaded bolt, of sufficient length to extend out beyond an expected length, and a threaded nut, that is removed and retightened as clamp portion pairs are added or subtracted.

Each pair of clamp portions (e.g., 632A and 632B) may include structural features to help retain/align an adjacent pair of clamp portions (e.g., 632C and 632D). Within the shown example, each clamp portion pair (e.g., 632A and 632B) includes a set of projections 640 on one axial side and a set of receptacles 641 on an opposite axial side. The projections 640 of one pair of clamp portions (e.g., 632A and 632B) may fit into the receptacles 641 of an adjacent pair of clamp portions (e.g., 632C and 632D). Of course, the features to help retain/align adjacent pairs of clamp portions may be varied and such variations are within the scope of the present disclosure. Similar to the other examples, each respective clamping portion (e.g., 632A) is actuatable to hold/retain a cable and each respective clamping portion (e.g., 632B) is separately actuatable and/or unactuatable.

It is to be appreciated that the above-discussed examples of clamps have clamp portions generally arranged in a matrix of one or more rows and one or more columns. However, it is within the scope of the present disclosure that different arrangements of clamp portions are possible.

Figure 17:
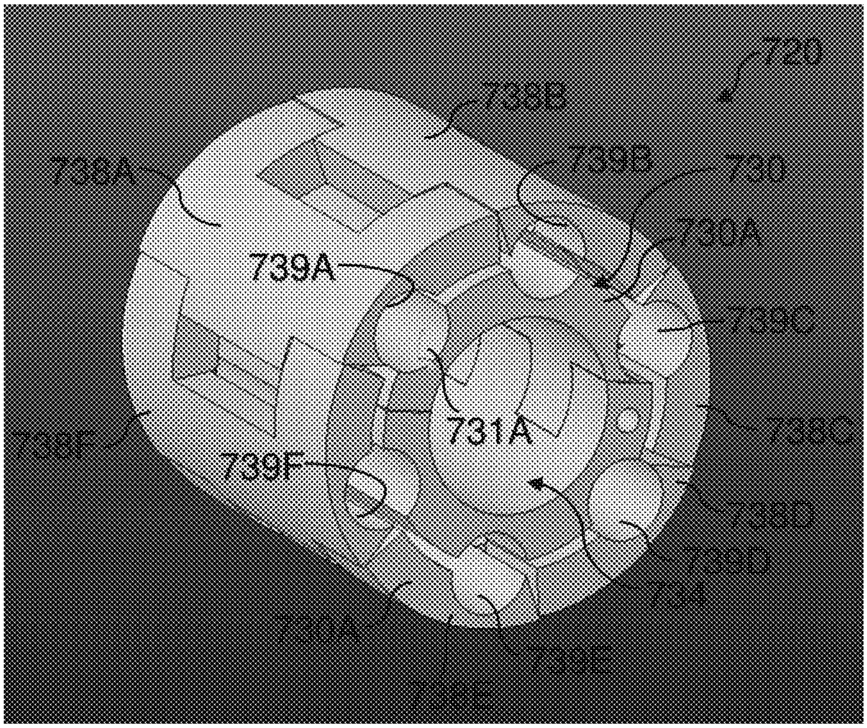
Figure 18:
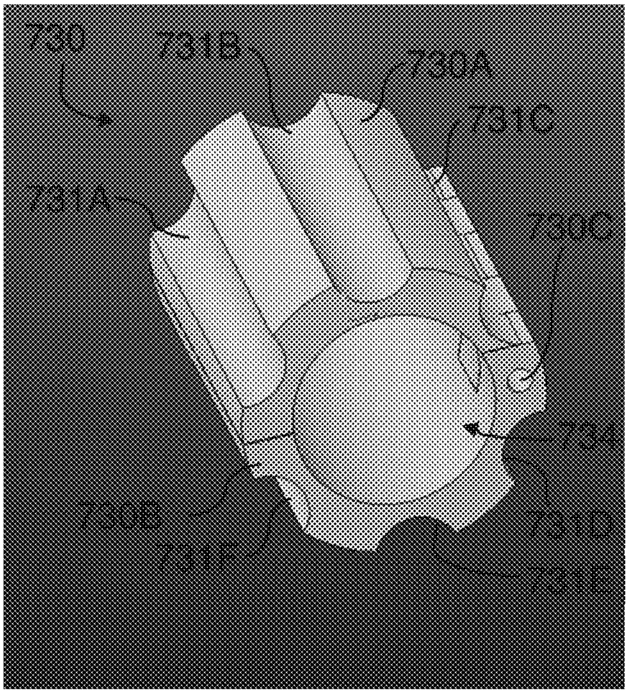
FIG. 18 is perspective illustration of a portion of the example cable tangent clamp of FIG. 17.
Figure 19:
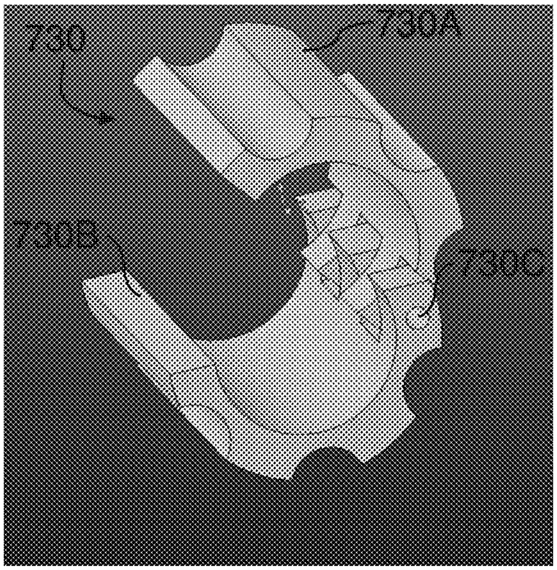
FIG. 19 is an illustration similar to FIG. 18, but showing the portion in an open position.

An example of such a different arrangement of clamp portions is shown within FIGS. 17-19. An overall clamp 720 (see FIG. 17) has a body 730 with a through-bore 734 extending therethrough. The clamp 720 may be supported via the though bore 734. For example, a fastener may extend via the through-bore and to a structure (e.g., a utility pole).

Within the shown example, the body 730 is provided as multiple body portions (e.g., within the shown example as two halves 730A, 730B) that are pivotally, and thus movably, connected (730C, see FIGS. 18 and 19) so as to allow the body to be moved to an opened condition (e.g., the process of opening). To be clear for the shown example, the opening is via relative pivoting movement of the multiple body portions (e.g., the example two halves 730A, 730B). Such opening may allow the body 730 to be mounted upon a structure or the like (e.g., an existing bolt) that will extend through the through-bore 734.

It is to be noted that the example body 730 has a generally cylindrical shape and a radially outer periphery of the body has a series of troughs 731 (e.g., 731A-731F) located about the outer periphery. Of course, other shapes and thus outer peripheries are contemplated and within the scope of the present disclosure. Within the shown example, there are six troughs 731A-731F. However, it is within the scope of the present disclosure that a different number (i.e., different from six) may be provided. Each trough 731 has a general hemicylindrical shape that has an axial extend that is parallel to an axis of the through-bore 734. Each trough 731 is for receipt of a respective cable. Although not shown, the troughs may include recesses and/or cushions, similar to the above-mentioned recesses and cushions.

So, the example of FIGS. 17-19 is another example of an embodiment that has at least one of plural clamping portions that includes at least one segment that is integral with the body. Of course, the example of FIGS. 17-19 is an example of an embodiment that has a plurality of separately actuatable clamping portions associated with such body.

One or more (e.g., six) movable members 738 (e.g., 738A-738F) are provided to mate with and attach to the body 730. Each movable member 738 is associated within one of the troughs 731 on the body 730. Each movable member 738 has a trough (e.g., 739A-739F) that is hemicylindrical and a complement to the respective trough (e.g., 731A-731F) on the body 730. Each respective pair of toughs (e.g., 731A and 739A) are for receipt of a respective cable. Each movable member (e.g., 738A) is movable to a closed, clamping position such that the respective cable is clamped within the respective pair of troughs (e.g., 731A and 739A) and thus clamped between the movable member and the body 730. Thus, a respective clamping portion is provided at each respective pair of troughs (e.g., 731A and 739A). Each respective clamping portion is provided by a respective portion of the body 730 at the respective trough (e.g., 731A) on the body and the respective portion of the movable member (e.g., 738A) at the respective trough (e.g., 739A) on the movable member.

It is to be appreciated that the clamping portions are thus arranged around the entirety of the cylindrical shape. As such, the clamping portions are arranged within an arc that extends 360°. Of course, any subset (e.g., fewer than six within the shown example) of clamping portions extend in an arc that is less than 360°.

Although not shown, the troughs (e.g., 739A-739F) may include recesses and/or cushions, similar to the above-mentioned recesses and cushions. Although not shown, the movable members (e.g., 738A-738F) and the body 730 have cooperating portions for connecting each respective movable member for movement relative to the body and portions to permit the moveable member to be tightened and secured to the body (e.g., to provide the above-mentioned clamping of a respective cable).

It is to be appreciated that all (e.g., six within the shown example) of the available clamping portions (e.g., respective pair of troughs 731A and 739A) need not be utilized. Such is especially so when the clamp 720 is initially installed into service. Thus, some number (e.g., five of fewer within the shown example) of the possible maximum (e.g., six within the shown example) of clamping portions could be utilized to hold/retain respective cable(s) at one point in time, and then at some other point in time additional clamping portions up to the maximum could be utilized to retain added cable(s). Thus, similar to the other examples, each respective clamping portion (e.g., 732A) is actuatable to hold/retain a cable and each respective clamping portion (e.g., 732B) is separately actuatable and/or unactuatable.

Figure 20:
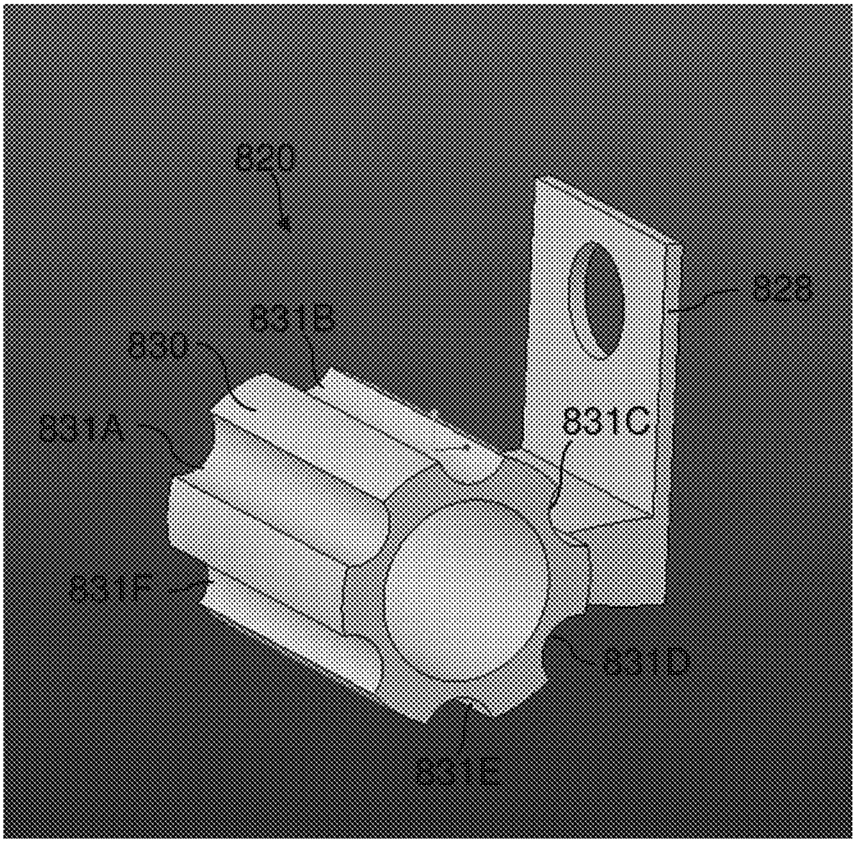

Of course, variations are contemplated and thus within the scope of the present disclosure. FIG. 20 provides an example of such possible variations. Specifically, FIG. 20 shows a body 830, of an overall clamp 820, that is mounted to a bracket 828. The bracket 828 may, in-turn, be mounted to a structure (e.g., a utility pole). The body 830 has troughs (e.g., 831A-831F) similar to the example of FIG. 17-19. So, the example of FIG. 20 is another example of an embodiment that has at least one of plural clamping portions that includes at least one segment that is integral with the body. Of course, the example of FIG. 20 is an example of an embodiment that has a plurality of separately actuatable clamping portions associated with such body.

Movable members (not shown within FIG. 19), up to a maximum (e.g., six) based upon the number (e.g., six) of troughs (e.g., 831A-831F) on the body 830, may be provided to provide a variable number of clamp portions for retaining/holding up to a maximum (e.g., six) number of cables. Again, the number of clamping portions, specific structures, etc. may be varied.

Figure 21:
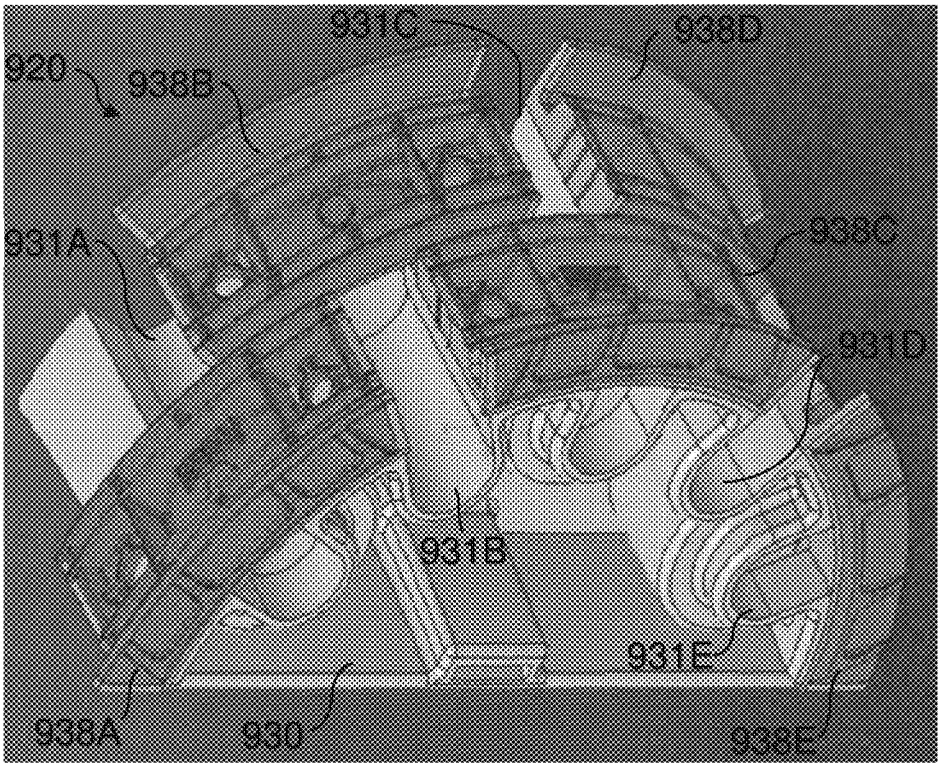
FIG. 21 is a perspective illustration of another example cable tangent clamp, in accordance with some aspects of the present disclosure, which may hold plural cables.
Figure 22:
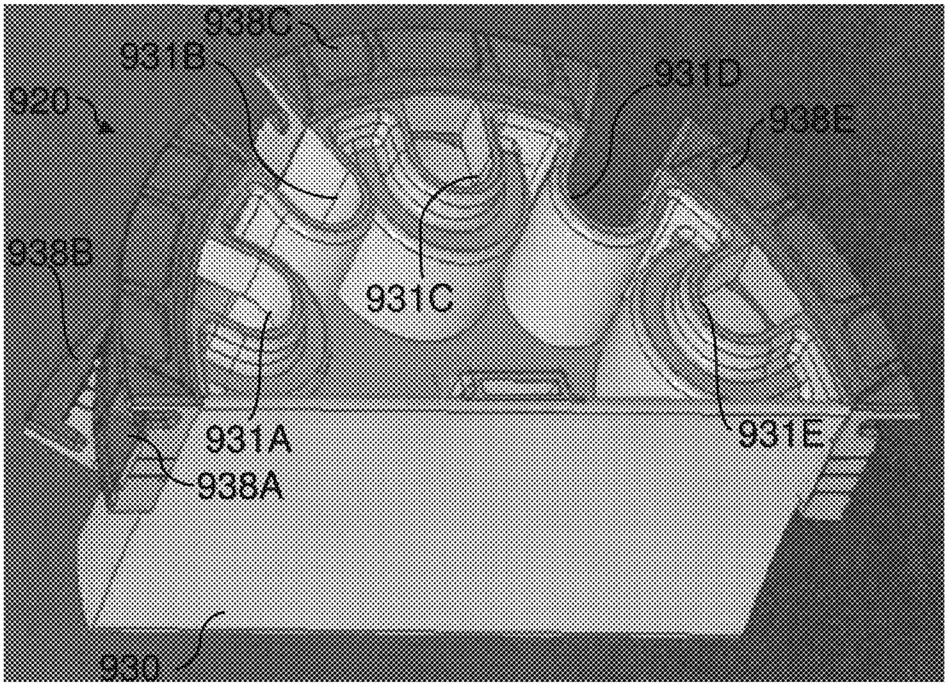
FIG. 22 is a reverse-angle perspective illustration of the example cable tangent clamp of FIG. 21.

Still further, the configuration of clamping portions within an overall clamp may be further varied and such is within the scope of the present disclosure. A further example of such variation is shown within an example clamp 920 of FIGS. 21 and 22. The shown example clamp 920 has a body 930 that has a general half circular, arc shape. As such the arc is a 180° arc. A plurality (e.g., five) of troughs (e.g., 931A-931E) are located along an outer radial periphery of the body 930. So, the example of FIGS. 21 and 22 is another example of an embodiment that has at least one of plural clamping portions that includes at least one segment that is integral with the body. Of course, the example of FIGS. 21 and 22 is an example of an embodiment that has a plurality of separately actuatable clamping portions associated with such body.

Of course, a different number (i.e., different from the number five) of troughs may be provided. Movable members (e.g., 938A-938E) may be provided to retain each respective cable within a respective trough (e.g., 931A-931E). Within an example, the movable members (e.g., 938A-938E) may be referred to as end caps.

Within the shown example, each movable member (e.g., 938A-938E) has an arc shape that mates to a segment of the radial periphery of the body 930. Movement of each movable member (e.g., 938A-938E) may include movement to mate the moveable member to the body (e.g., the respective arc shapes are mated together). Thus, similar to some of the other examples, the aspect of movable includes removability. Thus, it is again stated that "movable" may include a variety of possible movements, movement types, and specifically may include removing and/or moving to install as a movement. Such is applicable to this example and all of the examples of the present disclosure.

One or more fasteners (e.g., two bolts) may secure and tighten the respective movable member (e.g., 938A-938E) to the body 930 and thus grip and hold the respective cable. As another example, the movable members may be pivotable relative to the body 930. For such an example, the aspect of movable would include pivot movement.

Each portion of the body 930 containing a respective trough (e.g., 931A-931E) and the respective movable member (e.g., 938A-938E) provide a respective clamping portion. Of course, the body 930 and/or the movable members (e.g., 938A-938E) may include cushions or the like. Also, with the shown example, placement and securing of each moveable member (e.g., 938A-938E) is axially staggered relative to an adjacent movable member (e.g., 938A-938E).

It is to be appreciated that less than a maximum (e.g., five) cables may be supported by the overall clamp 920. It is possible that the additional cable(s) may be added or subtracted at a different time. Thus, similar to the other examples, each respective clamping portion (e.g., 932A) is actuatable to hold/retain a cable and each respective clamping portion (e.g., 932B) is separately actuatable and/or unactuatable. It is to be understood that the movable members (e.g., 938A-938E) may be placed upon the body 930, but unused to retain a respective cable until desired. Alternatively, the movable members (e.g., 938A-938E) may be added/installed, or removed, as number of cabled to be held is changed.

It is to be appreciated that the five clamping portions of the shown example are thus arranged within an arc that extends 180°. Of course, any subset (e.g., fewer than five within the shown example) of clamping portions extend in an arc that is less than 180°.

Mounting of the body 930 to a structure (e.g., a utility pole) may be via a variety of devices/techniques (e.g., fastener(s), banding strap(s), etc.). In an example, the body 930 is affixed to a metallic pole bracket. In another example, pole mount geometry could be integrated into the body 930.

Figure 23:
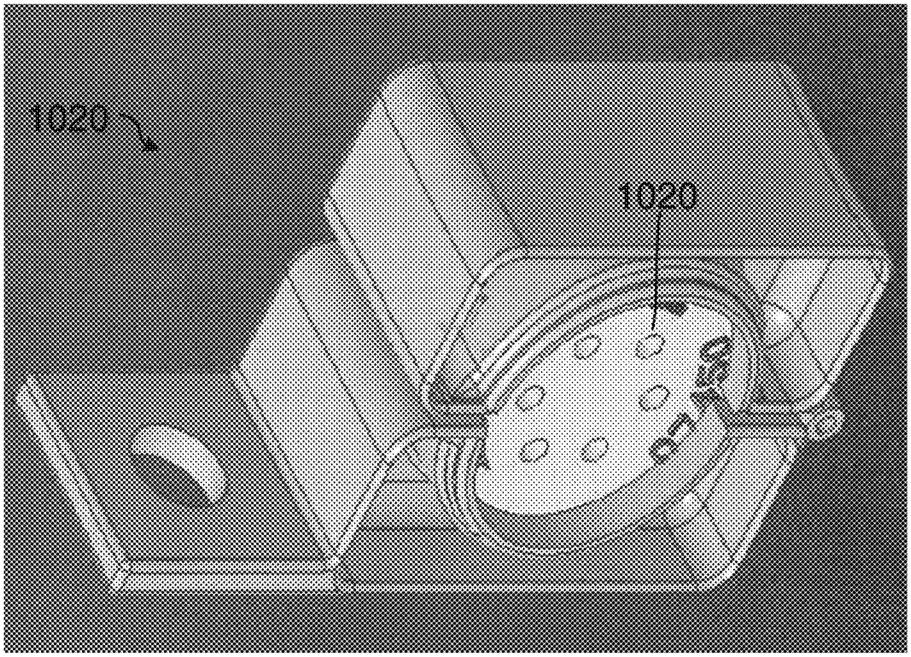
FIG. 23 is a perspective illustration of another example cable tangent clamp, in accordance with some aspects of the present disclosure, which may hold plural cables.
Figure 24:
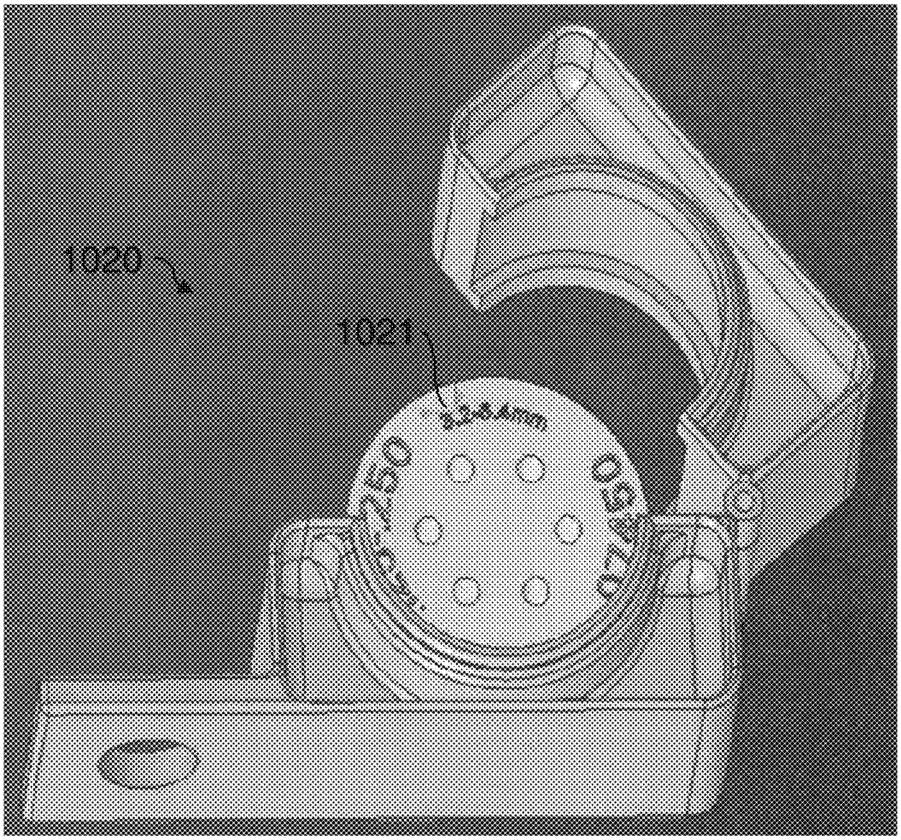
FIG. 24 is a reverse-angle perspective illustration of the example cable tangent clamp of FIG. 23.

FIGS. 23 and 24 provide yet another variant of a clamp 1020 to retain one or more, up to a maximum (e.g., six) cables. A resilient cushion 1021 has a plurality of through holes for such cable(s). A pivoting clamp provide a compressive, and thus holding force.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A tangent clamp comprising:

a single, monolith piece body to be supported by a structure and to permit cables to proceed along a tangential direction relative to the structure, the body having a plurality of hemicylindrical trough shapes each to engage, grip, and support a respective one of the cables; and a plurality of separately actuatable clamping portions associated with the body, with each of the separately actuatable clamping portions having a single mating hemicylindrical trough shape to engage, grip, and support the respective one of the cables, and each of the separately actuatable clamping portions being configured to operate for optionally retaining or releasing the respective one of the cables;

wherein at least some of the plurality of separately actuatable clamping portions are immediately adjacent to each other and arranged in a linear sequential row.

2. The tangent clamp as set forth in claim 1, wherein at least one of the plurality of separately actuatable clamping portions includes at least one segment that is integral with the body.

3. The tangent clamp as set forth in claim 2, wherein at least one of the plurality of separately actuatable clamping portions is removably attached to the body.

4. The tangent clamp as set forth in claim 1, wherein each separately actuatable clamping portion, of the plurality of separately actuatable clamping portions, includes a movable member.

5. The tangent clamp as set forth in claim 4, wherein removal is the movement associated with the movable member.

6. The tangent clamp as set forth in claim 1, wherein the body includes plural body segments.

7. The tangent clamp as set forth in claim 6, wherein at least one separately actuatable clamping portion, of the plurality of separately actuatable clamping portions, is provided upon each body segment of the plural body segments.

8. The tangent clamp as set forth in claim 6, wherein plural separately actuatable clamping portions, of the plurality of separately actuatable clamping portions, are provided upon at least one body segment of the plural body segments.

9. The tangent clamp as set forth in claim 1, wherein the plurality of separately actuatable clamping portions are arranged in an array and the array has a major extent in a horizontal direction that lies within a plane that is parallel to a plane within which the tangential direction lies.

10. The tangent clamp as set forth in claim 1, wherein the plurality of separately actuatable clamping portions are arranged in an array and the array has a major extent in a vertical direction that is non-parallel to the tangential direction.

11. A tangent clamp comprising:

a single, monolith piece body to be supported by a structure and to permit cables to proceed along a tangential direction relative to the structure, the body having a plurality of segments each to grip and retain a respective one of the cables; and at least one clamping portion associated with the body, with each of the at least one clamping portion being separately actuatable and having a segment to grip and retain the respective one of the cables while in a respective actuated condition and release the respective one of the cables while not in the respective actuated condition, wherein at least some clamping portions are immediately adjacent to each other and arranged in a linear sequential row.

12. The tangent clamp as set forth in claim 11, wherein at least one of the at least one clamping portion includes at least one segment that is integral with the body.

13. The tangent clamp as set forth in claim 11, wherein at least one of the at least one clamping portion is removably attached to the body.

14. The tangent clamp as set forth in claim 11, wherein the body provided as multiple portions.

15. The tangent clamp as set forth in claim 11, wherein the body has plural troughs.

16. The tangent clamp as set forth in claim 15, wherein each of the at least one clamping portion includes a respective movable member that is associated with a respective one of the plural troughs.

17. A tangent clamp comprising:

a single, monolith piece body to be supported by a structure and to permit cables to proceed along a tangential direction relative to the structure; and a plurality of separately actuatable clamping portions, each having a single hemicylindrical trough shape, associated with the body to engage, grip, and support a respective one of the cables, wherein at least some of the plurality of separately actuatable clamping portions are immediately adjacent to each other and arranged in a linear sequential row, with the body configured to permit at least one additional actuatable clamping portion to be provided upon the body, and each separately actuatable clamping portion being configured to operate for optionally retaining or releasing the respective one of the cables.

18. The tangent clamp as set forth in claim 17, wherein at least one of the plurality of separately actuatable clamping portions is removably attached to the body.

19. The tangent clamp as set forth in claim 17, wherein at least one of the plurality of separately actuatable clamping portions includes at least one segment that is integral with the body.

20. The tangent clamp as set forth in claim 19, wherein at least one of the plurality of separately actuatable clamping portions includes a movable member.

* * * * *